United States Patent
Rolchigo et al.

[11] Patent Number: 5,993,674
[45] Date of Patent: Nov. 30, 1999

[54] ROTARY DISC FILTRATION DEVICE WITH MEANS TO REDUCE AXIAL FORCES

[75] Inventors: Philip M. Rolchigo, Warren; Leonard T. Hodgins, Closter; Guanghua Yu, Rockaway, all of N.J.

[73] Assignee: Membrex, Inc., Fairfield, N.J.

[21] Appl. No.: 09/030,367

[22] Filed: Feb. 24, 1998

[51] Int. Cl.⁶ .................................................. B01D 33/15
[52] U.S. Cl. ...................... 210/780; 210/330; 210/321.63
[58] Field of Search .............................. 210/780, 321.63, 210/330, 332, 324, 767, 331

[56] References Cited

U.S. PATENT DOCUMENTS

| | | |
|---|---|---|
| 1,762,560 | 6/1930 | Morton . |
| 3,455,821 | 7/1969 | Aremaa . |
| 3,477,575 | 11/1969 | Nemec et al. . |
| 3,884,813 | 5/1975 | Donovan et al. . |
| 4,025,425 | 5/1977 | Croopnick . |
| 4,066,546 | 1/1978 | Sasaki . |
| 4,132,649 | 1/1979 | Croopnick . |
| 4,216,094 | 8/1980 | Solum . |
| 4,311,589 | 1/1982 | Brumfield . |
| 4,330,405 | 5/1982 | Davis et al. . |
| 4,376,049 | 3/1983 | Valentine . |
| 4,592,848 | 6/1986 | Pabst . |
| 4,708,797 | 11/1987 | Baur et al. . |
| 4,717,485 | 1/1988 | Brunsell et al. . |
| 4,781,835 | 11/1988 | Bahr et al. . |
| 4,790,942 | 12/1988 | Shmidt et al. . |
| 4,867,878 | 9/1989 | Rashev . |
| 4,872,806 | 10/1989 | Yamada et al. . |
| 4,876,013 | 10/1989 | Shmidt et al. . |
| 4,906,379 | 3/1990 | Hodgins et al. . |
| 4,911,847 | 3/1990 | Shmidt et al. . |
| 4,950,403 | 8/1990 | Hauff et al. . |
| 5,000,848 | 3/1991 | Hodgins et al. . |
| 5,143,630 | 9/1992 | Rolchigo . |
| 5,254,250 | 10/1993 | Rolchigo et al. . |
| 5,599,164 | 2/1997 | Murray . |

FOREIGN PATENT DOCUMENTS

| | | |
|---|---|---|
| 258313 | 11/1967 | Austria . |
| 0 226 659 | 7/1987 | European Pat. Off. . |
| 0 227 084 | 7/1987 | European Pat. Off. . |
| 0 304 833 | 3/1989 | European Pat. Off. . |
| 0 324 865 | 7/1989 | European Pat. Off. . |
| 0 338 433 | 10/1989 | European Pat. Off. . |
| 0 443 469 | 8/1991 | European Pat. Off. . |
| 0 532 237 | 3/1993 | European Pat. Off. . |
| 343 144 | 10/1921 | Germany . |
| 1057015 | 2/1967 | United Kingdom . |
| WO 93/12859 | 7/1993 | WIPO . |
| WO 97/19745 | 6/1997 | WIPO . |

OTHER PUBLICATIONS

Aqua Technology Resource Management, Inc., "How to Keep Your Fluid Processing Budget from Going to Waste," 3–page brochure.

Aqua Technology Resource Management, Inc., 4–page brochure (untitled) discussing "Technology Background," Overcoming Concentration Polarization, etc.

Fodor, "Mechanical Seals: Design Solutions for Trouble Free Sterile Applications," *Bioprocess Engineering Symposium*, The American Society of Mechanical Engineers (1990), pp. 89–98.

(List continued on next page.)

*Primary Examiner*—Robert J. Popovics
*Attorney, Agent, or Firm*—Bryan Cave LLP

[57] ABSTRACT

Rotary disc filtration devices and filtration processes using those devices are disclosed. The devices have one or more fluid filtration gaps into which fluid to be filtered is placed. Each fluid filtration gap is defined by a disc and a filter, one of which rotates with respect to the other. The filter is carried on a filter support member. Fresh feed is introduced to each fluid filtration gap near the longitudinal axis of the shaft on which the discs are rotated. Holes through the disc in the active area of the disc, which is the area opposite the filter, counteract the tendency of the disc and filter to move towards one another.

46 Claims, 4 Drawing Sheets

OTHER PUBLICATIONS

Ingersoll–Rand, "Upgrade your entire filtering and/or washing operation with the new Artisan Dynamic Thickener/Washer," Bulletin No. 4081, 4 pages (Feb. 1986).

Ingersoll–Rand, "Patented filter/wash capability permits simultaneous washing and filtering," Bulletin No. 4060, 4 pages (Aug. 1983).

Lebeck, *Principles and Design of Mechanical Face Seals,* pp. 17–20, 107, 146 (John Wiley & Sons, Inc. 1991).

Molga and Wronski, "Dynamic Filtration in Obtaining of High Purity Materials—Modelling of the Washing Process," *Proceedings of the Royal Flemish Society of Engineers,* Antwerp, Belguim, Oct. 1988, vol. 4, pp. 69–77.

Murkes and Carlsson, *Crossflow Filtration—Theory and Practice,* pp. 69–99, John Wiley & Sons, New York (1988).

Parkinson, "Novel Separator Makes Its Debut," *Chemical Engineering* (Jan. 1989), 1–page reprint by Aqua Technology Resource Management, Inc.

Rudniak and Wronski, "Dynamic Microfiltration in Biotechnology," *Proceedings 1st Event: Bioprocess Engineering,* Institute of Chemical and Process Engineering, Warsaw University of Technology, Warsaw, Poland, Jun. 26–30, 1989.

Schweigler and Stahl, "High Performance Disc Filter for Dewatering Mineral Slurries," *Filtration and Separation,* Jan./Feb., pp. 38–41 (1990).

Shirato and Murase, Yamazaki, Iwata, ad Inayoshi, "Patterns of Flow in a Filter Chamber during Dynamic Filtration with a Grooved Disk," *International Chem. Eng.,* vol. 27, pp. 304–310 (1987).

Snowman, "Sealing Technology in Lyophilizers," in *Bioprocessors Engineering Symposium,* The American Society of Mechanical Engineers (1989), pp. 81–86.

Todhunter, "Improving the Life Expectancy of Mechanical Seals in Aseptic Service," *Bioprocess Engineering Symposium,* The American Society of Mechanical Engineers (1989), pp. 97–103.

Watabe, "Experiments on the Fluid Friction of a Rotating Disc with Blades," *Bulletin of JSME,* vol. 5, No. 17, pp. 49–57 (1962).

Wisniewski, "Anticipated Effects of Seal Interface Operating Conditions on Biological Materials," *Bioprocess Engineering Symposium,* The American Society of Mechanical Engineers (1989), pp. 87–96.

Wronski, "Filtracja dynamiczna roztworow polimerow," *Inz. i Ap. Chem.,* No. 1, pp. 7–10 (1983).

Wronski, Molga, and Rudniak, "Dynamic Filtration in Biotechnology," *Bioprocess Engineering,* vol. 4, pp. 99–104 (1989).

Wronski and Mroz, "Power Consumption in Dynamic Disc Filters," *Filtrations & Separation,* Nov./Dec., pp. 397–399 (1984).

Wronski and Mroz, "Problems of Dynamic Filtration," *Reports of the Institute of Chemical Engineering,* Warsaw Techn. Univ., T.XI, z.3–4, pp. 71–91 (1982).

Wronski, Rudniak, and Molga, "Resistance Model for High–Sear Dynamic Microfiltration," *Filtration & Separation,* Nov./Dec., pp. 418–420 (1989).

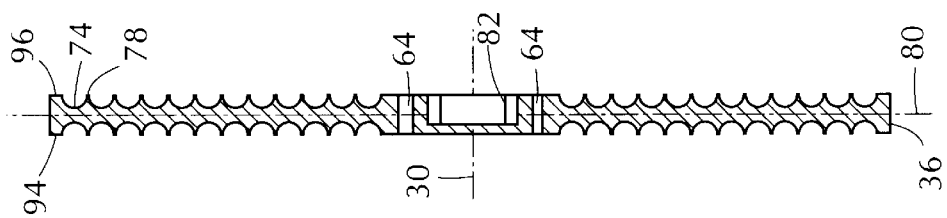
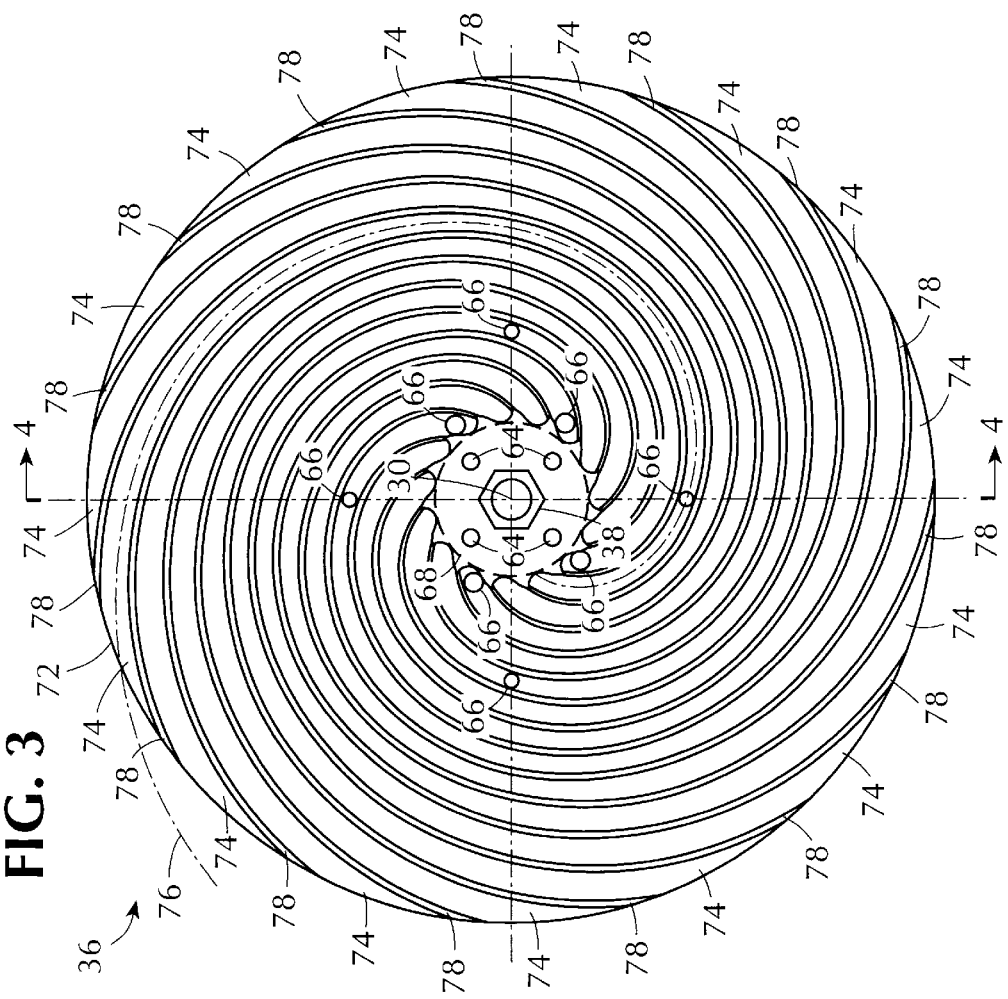

ROTARY DISC FILTRATION DEVICE WITH MEANS TO REDUCE AXIAL FORCES

BACKGROUND OF THE INVENTION

1. Technical Field

This invention concerns the field of filtration and more specifically, rotary disc filtration devices.

2. Background Art

Filtration devices are used to separate one or more components of a fluid from other components. Common processes carried out in such devices include classic filtration, microfiltration, ultrafiltration, reverse osmosis, dialysis, electrodialysis, pervaporation, water splitting, sieving, affinity separation, affinity purification, affinity sorption, chromatography, gel filtration, and bacteriological filtration. As used herein, the term "filtration" includes all of those separation processes as well as any other processes using a filter that separate one or more components of a fluid from the other components of the fluid.

Filtration processes make use of the greater filter permeability of some fluid components than others. As used herein, the term "filter" includes any article made of any material that allows one or more components of a fluid to pass through it to separate those components from other components of the fluid. Thus, the term "filter" includes metallic and polymeric cloth filters, semipermeable membranes and inorganic sieve materials (e.g., zeolites, ceramics). A filter may have any shape or form, for example, woven or non-woven fabrics, fibers, membranes, sieves, sheets, films, and combinations thereof.

The components of the fluid that pass through the filter comprise the "permeate" and those that do not pass (i.e., are rejected by the filter or are held by the filter) comprise the "retentate." The valuable fraction from the filtration process may be the retentate or the permeate or in some cases both may be valuable.

A common technical problem in all filtration devices is blinding or clogging of the filter. Permeate passing through the filter from the fluid layer adjacent to the feed side of the filter leaves a retentate layer adjacent to or on that side of the filter having a different composition than that of the bulk feed fluid. This material may bind to the filter and clog its pores (that is, foul the filter) or remain as a stagnant boundary layer, either of which hinders transport of the components trying to pass through the filter to the permeate product side of the filter. In other words, mass transport per unit area through the filter per unit time (i.e., flux) is reduced and the inherent sieving capability of the filter is adversely affected.

Generally, fouling of the filter is chemical in nature, involving chemisorption of substances in the feed fluid onto the filter's internal (pore) and external surface area. Unless the chemical properties of the filter surface are altered to prevent or reduce adsorption, frequent and costly filter replacement or cleaning operations are necessary.

One of the most common causes of fouling arises from the low surface energy (e.g., hydrophobic nature) of many filters. U.S. Pat. Nos. 4,906,379 and 5,000,848, which are assigned to Membrex, Inc., assignee of the present application, disclose chemical modification to increase the surface free energy (e.g., hydrophilicity) of filter surfaces. (All of the documents identified, discussed, or otherwise referenced in this application are incorporated herein in their entirety for all purposes.) In general, however, relatively little attention has been given to modifying surface chemistry to reduce filter fouling.

In contrast to the chemical nature of most fouling problems, the formation of a boundary layer near the surface of the filter is physical in nature, arising from an imbalance in the mass transfer of feed fluid components towards the filter surface as compared to the back-transfer from the boundary layer to the bulk feed fluid. Some form of force (for example, mechanical, electro-kinetic) must be used to promote the desired mass transfer away from the filter surface. Unfortunately, few strategies have been developed that promote adequate back-mixing to reduce the boundary layer or prevent its formation.

The most common strategy is called "cross-flow" filtration ("CFF") or "tangential flow" filtration ("TFF"). In principle, the feed fluid is pumped across (i.e., parallel to) the outer surface of the filter at a velocity high enough to disrupt and back-mix the boundary layer. In practice, however, cross-flow has several disadvantages. For example, equipment must be designed to handle the higher flow rates that are required, and such higher flow rates generally require recirculating retentate. However, recirculation can injure certain materials that may be present in the fluid (e.g., cells, proteins) and make them unsuitable for further use (e.g., testing).

A different approach to eliminating the stagnant boundary layer involves decoupling the feed flow rate from the applied pressure. With this approach, a structural element of the filtration device, rather than the feed fluid, is moved to effect back-mixing and reduction of the boundary layer. The moving body may be the filter itself or a body located near the filter element.

Some of the rare moving-body devices that have enhanced filtration without energy inefficient turbulence are exemplified in U.S. Pat. No. 4,790,942, U.S. Pat. No. 4,876,013, and U.S. Pat. No. 4,911,847 (assigned to Membrex, Inc.). These three patents each disclose the use of filtration apparatus comprising outer and inner cylindrical bodies defining an annular gap for receiving a feed fluid. The surface of at least one of the bodies defining the gap is the surface of a filter, and one or both of the bodies may be rotated. Induced rotational flow between these cylinders is an example of unstable fluid stratification caused by centrifugal forces. The onset of this instability can be expressed with the aid of a characteristic number known as the Taylor number. Above a certain value of the Taylor number, a vortical flow profile comprising so-called Taylor vortices appears. This type of secondary flow causes highly efficient non-turbulent shear at the filter surface(s) that reduces the stagnant boundary layer thickness and, thus, increases the permeate flux.

In contrast to classic cross-flow filtration, the devices of U.S. Pat. No. 4,790,942, U.S. Pat. No. 4,876,013, and U.S. Pat. No. 4,911,847 allow the shear rate near the filtration surface and the transmembrane pressure to be independently controlled. Furthermore, because those two operating parameters are independent and high feed rates are not required to improve the permeate flux, the feed rate can be adjusted to avoid non-uniform transmembrane pressure distributions. Accordingly, mechanically agitated systems of this type enable precise control over the separation.

Rotary disc filtration devices also allow shear rate near the filtration surface and transmembrane pressure to be independently controlled. In such devices feed fluid is placed between the disc and oppositely disposed filtration surface that define the fluid filtration gap and one or both of the disc and filtration surface are rotated. See, e.g., U.S. Pat. No. 5,143,630 and 5,254,250 (both assigned to Membrex, Inc.).

Additional documents concerning rotating impellers, rotary discs, filtration, rotary disc filtration devices, other filtration devices using mechanical agitation, and seals include: U.S. Pat. No. 1,762,560; U.S. Pat. No. 3,455,821; U.S. Pat. No. 3,477,575; U.S. Pat. No. 3,884,813;

U.S. Pat. No. 4,025,425; U.S. Pat. No. 4,066,546; U.S. Pat. No. 4,132,649; U.S. Pat. No. 4,216,094; U.S. Pat. No. 4,311,589; U.S. Pat. No. 4,330,405; U.S. Pat. No. 4,376,049; U.S. Pat. No. 4,592,848; U.S. Pat. No. 4,708,797; U.S. Pat. No. 4,717,485; U.S. Pat. No. 4,781,835; U.S. Pat. No. 4,867,878; U.S. Pat. No. 4,872,806; U.S. Pat. No. 4,906,379; U.S. Pat. No. 4,950,403; U.S. Pat. No. 5,000,848; U.S. Pat. No. 5,599,164; Austrian Patentschrift 258313; European Published Application Nos. 0 226 659, 0 227 084, 0 304 833, 0 324 865, 0 338 433, 0 443 469, and 0 532 237; German Patentschrift 343 144; PCT Published Application WO 93/12859; PCT Published Application WO 97/19745 (corresponding to U.S. Pat. No. 5,707,517, owned by Membrex, Inc.); U.K. 1,057,015; Aqua Technology Resource Management, Inc., "How to Keep Your Fluid Processing Budget from Going to Waste," 3-page brochure; Aqua Technology Resource Management, Inc., 4-page brochure (untitled) discussing "Technology Background," "Overcoming Concentration Polarization," etc.; Fodor, "Mechanical Seals: Design Solutions for Trouble Free Sterile Applications," *Bioprocess Engineering Symposium,* The American Society of Mechanical Engineers (1990), pages 89–98; Ingersoll-Rand, "Upgrade your entire filtering and/or washing operation with the new Artisan Dynamic Thickener/Washer," Bulletin No. 4081, 4 pages (2/86); Ingersoll-Rand, "Patented filter/wash capability permits simultaneous washing and filtering,"Bulletin No. 4060, 4 pages (8/83); Lebeck, *Principles and Design of Mechanical Face Seals,* pages 17–20, 107, 146 (John Wiley & Sons, Inc. 1991); Molga and Wronski, "Dynamic Filtration in Obtaining of High Purity Materials—Modelling of the Washing Process," *Proceedings of the Royal Flemish Society of Engineers,* Antwerp, Belgium, October 1988, Volume 4, pages 69–77; Murkes and Carlsson, *Crossflow Filtration—Theory and Practice,* pages 69–99, John Wiley & Sons, New York (1988); Parkinson, "Novel Separator Makes Its Debut," *Chemical Engineering* (January 1989), 1-page reprint by Aqua Technology Resource Management, Inc.; Rudniak and Wronski, "Dynamic Microfiltration in Biotechnology," *Proceedings 1st Event: Bioprocess Engineering,* Institute of Chemical and Process Engineering, Warsaw University of Technology, Warsaw, Poland, Jun. 26–30, 1989; Schweigler and Stahl, "High Performance Disc Filter for Dewatering Mineral Slurries," *Filtration and Separation,* January/February, pages 38–41 (1990); Shirato, Murase, Yamazaki, Iwata, and Inayoshi, "Patterns of Flow in a Filter Chamber during Dynamic Filtration with a Grooved Disk," *International Chem. Eng.,* Volume 27, pages 304–310 (1987); Snowman, "Sealing Technology in Lyophilizers," in *Bioprocess Engineering Symposium,* The American Society of Mechanical Engineers (1989), pages 81–86; Todhunter, "Improving the Life Expectancy of Mechanical Seals in Aseptic Service," *Bioprocess Engineering Symposium,* The American Society of Mechanical Engineers (1989), pages 97–103; Watabe, "Experiments on the Fluid Friction of a Rotating Disc with Blades," *Bulletin of JSME,* Volume 5, number 17, pages 49–57 (1962); Wisniewski, "Anticipated Effects of Seal Interface Operating Conditions on Biological Materials," *Bioprocess Engineering Symposium,* The American Society of Mechanical Engineers (1989), pages 87–96; Wronski, "Filtracja dynamiczna roztworow polimerow," *Inz. i Ap. Chem.,* number 1, pages 7–10 (1983); Wronski, Molga, and Rudniak, "Dynamic Filtration in Biotechnology," *Bioprocess Engineering,* Volume 4, pages 99–104 (1989); Wronski and Mroz, "Power Consumption in Dynamic Disc Filters," *Filtration & Separation,* November/December, pages 397–399 (1984); Wronski and Mroz, "Problems of Dynamic Filtration," *Reports of the Institute of Chemical Engineering,* Warsaw Techn. Univ., T.XI, z.3–4, pages 71–91 (1982); and Wronski, Rudniak, and Molga, "Resistance Model for High-Shear Dynamic Microfiltration," *Filtration & Separation,* November/December, pages 418–420 (1989).

Conventional rotating disc filter devices utilize stacked filter disc arrangements. Historically, most of these devices comprise disc filters that are rotated by a central drive shaft to which the filter elements are attached. Some rotating disc devices utilize stationary filter discs separated from each other by rotary elements attached to the shaft. Murkes and Carlsson, *Crossflow Filtration—Theory and Practice,* John Wiley & Sons, New York (1988), FIG. 3.15 at page 91. In this type of device a unitary stationary filter element surrounds the central rotating drive shaft.

The effectiveness of rotating disc filtration devices depends in large part upon the flowpaths of the feed, retentate, and permeate fluids. Means to overcome the potential for buildup of rejected species caused by flowpath limitations may involve changing either the rotating disc design (e.g., adding blades or grooves), or changing the feed pathways, or both. In some designs, feed fluid is introduced near the peripheries of the filter(s) and disc(s). In other designs, feed fluid is introduced near the axis of rotation (longitudinal axis of the filter(s) and disc(s)) and the feed fluid may be delivered to the fluid filtration gap(s) via hollow rotating shafts having ports (or nozzles) to direct the feed to either or both sides of the filter support members.

It has been found that in some cases during use of a rotary disc filtration device, the disc and its adjacent filter defining the fluid filtration gap may contact one another, which is highly undesirable (e.g., the "binding" or "rubbing" of disc against filter may significantly increase power requirements, the filter may be harmed, and the rotary bearings may suffer premature wear or failure). Despite all the development work concerning rotary disc filtration devices, the need still exists for rotary disc filtration devices that can avoid such contact and the ensuing problems.

SUMMARY OF THE INVENTION

Such devices have now been developed. In accordance with this invention, it has surprisingly been found that providing, in combination with the other elements of the invention, second feed means in the active area of a disc defining a fluid filtration gap will significantly alleviate these problems and provide other benefits. This was particularly surprising because placing the second feed means in the inactive (non-active) area of the disc does not appear to alleviate these problems or provide the benefits of this invention. The active area of the disc is that portion of the disc that is oppositely disposed to the filter's active area (which is the "active filtration area"). Thus, it is the active filtration area of the filter and the active area of the disc that are oppositely disposed from one another across the fluid filtration gap that those two active areas define. If the preferred spiral grooves are used on the disc, the active area of the disc will typically correspond to the grooved area because grooves would typically not be placed on the disc except where they were directly opposite the filter to define the fluid filtration gap.

The second feed means are desirably through-holes (holes) in the disc. Use of the second feed means in combination with the other elements of the device are presumed to reduce the net forces (pressures) acting on the two surfaces defining that gap that tend to move those two surfaces together. Other presumed unexpected benefits of the invention are that any starvation of the filtration process being conducted in that gap is avoided and the tendency for fouling of the filter defining that gap is reduced or eliminated. These benefits, as well as others, will be apparent to those skilled in the art from this disclosure.

Broadly, in one aspect this invention concerns a rotary disc filtration device for filtering feed fluid in a fluid filtration gap into permeate and retentate, the device comprising: (a) a filter support member having a major face, the major face having a filter with (i) an active filtration area, (ii) a peripheral region, and (iii) a longitudinal axis substantially perpendicular to the active filtration area; (b) a disc having first and second oppositely disposed major faces, the second major face having (i) an active area, (ii) a peripheral region, and (iii) a longitudinal axis substantially perpendicular to the active area; the active area of the disc and the active filtration area of the filter defining the fluid filtration gap therebetween, fluid passing from the fluid filtration gap through the active filtration area of the filter being the permeate and fluid not passing through the active filtration area of the filter being the retentate; (c) rotation means for rotating either the disc or the filter around the respective longitudinal axis or for rotating both so that the disc and filter rotate with respect to each other and a pumping action is created that tends to move fluid in the fluid filtration gap from near the longitudinal axis of the filter towards its peripheral region; (d) first feed means for feeding feed fluid to the fluid filtration gap near the longitudinal axis of the filter; and (e) second feed means in the disc for feeding fluid adjacent the first major face of the disc through the active area of the second face of the disc to the fluid filtration gap.

In another aspect this invention concerns a rotary disc filtration device for filtering feed fluid in one or more fluid filtration gaps into permeate and retentate, the device comprising (a) one or more filter support members each having first and second oppositely disposed major faces, each major face having a filter with (i) an active filtration area, (ii) a peripheral region, and (iii) a longitudinal axis substantially perpendicular to the active filtration area; (b) one or more discs mounted on a rotatable shaft and in alternating interleaved relationship with the filter support members to define a plurality of fluid filtration gaps, each disc having first and second oppositely disposed major faces, each major face having an active area and a peripheral region, the shaft having a longitudinal axis of rotation; each fluid filtration gap being defined by the active area of one of the discs and the active filtration area of the adjacent filter, fluid passing from each fluid filtration gap through the active filtration area of the one or more filters being the permeate and fluid not passing through the active filtration area of the one or more filters being the retentate; (c) rotation means for rotating the shaft so that the one or more discs rotate with respect to the filters and a pumping action is created that tends to move fluid in the fluid filtration gaps in a direction away from the longitudinal axis of the shaft; (d) first feed means for feeding feed fluid to each of the fluid filtration gaps near the longitudinal axis of the shaft; and (e) second feed means in at least one of the one or more discs for feeding fluid adjacent the active area of the first major face of the disc through the active area of the second major face of the disc to the fluid filtration gap defined by that second major face.

In another aspect this invention concerns a rotary disc filtration device for filtering feed fluid in one or more fluid filtration gaps into permeate and retentate, the device comprising: (a) one or more filter support members each having first and second oppositely disposed major faces, each major face having a filter with (i) an active filtration area, (ii) a peripheral region, and (iii) a longitudinal axis substantially perpendicular to the active filtration area; (b) one or more discs mounted on a rotatable shaft and in alternating interleaved relationship with the filter support members to define a plurality of fluid filtration gaps, each disc having first and second oppositely disposed major faces, each major face having an active area and a peripheral region, the shaft having a longitudinal axis of rotation; each fluid filtration gap being defined by the active area of one of the discs and the active filtration area of the adjacent filter, fluid passing from each fluid filtration gap through the active filtration area of the one or more filters being the permeate and fluid not passing through the active filtration area of the one or more filters being the retentate; (c) rotation means for rotating the shaft so that the one or more discs rotate with respect to the filters and a pumping action is created that tends to move fluid in the fluid filtration gaps in a direction away from the longitudinal axis of the shaft; (d) first feed means for feeding feed fluid to each of the fluid filtration gaps near the longitudinal axis of the shaft; and (e) second feed means in at least one of the one or more discs for feeding fluid adjacent the active area of the first major face of the disc through the active area of the second major face of the disc to the fluid filtration gap defined by that second major face, the second feed means comprising one or more holes through the disc, wherein substantially all of those holes in each disc are located at least about 0.1 R from the longitudinal axis of the shaft, where R is the equivalent circular radius of that disc.

In another aspect, the invention concerns a method for reducing the tendency for a rotary disc and a filter in a rotary disc filtration device to be forced together by the pumping action caused by the rotation of the disc or filter during the filtration process, the rotary disc filtration device comprising: (a) a filter support member having a major face, the major face having a filter with (i) an active filtration area, (ii) a peripheral region, and (iii) a longitudinal axis substantially perpendicular to the active filtration area; (b) a disc having first and second oppositely disposed major faces, the second major face having (i) an active area, (ii) a peripheral region, and (iii) a longitudinal axis substantially perpendicular to the active area; the active area of the disc and the active filtration area of the filter defining the fluid filtration gap therebetween; (c) rotation means for rotating the disc or the filter with respect to the other, thereby creating a pumping action that tends to move fluid in the fluid filtration gap from near the longitudinal axis of the filter towards its peripheral region; and (d) first feed means for feeding feed fluid to the fluid filtration gap near the longitudinal axis of the filter; the method comprising providing second feed means in the disc for feeding fluid adjacent the first major face of the disc through the active area of the second face of the disc to the fluid filtration gap.

In another aspect, the invention concerns a method for reducing the tendency for a rotary disc and a filter defining a fluid filtration gap in a rotary disc filtration device to be forced together by the pumping action caused by the rotation of the disc during the filtration process, the rotary disc filtration device comprising: (a) one or more filter support members each having first and second oppositely disposed major faces, each major face having a filter with (i) an active filtration area, (ii) a peripheral region, and (iii) a longitudinal axis substantially perpendicular to the active filtration area; (b) one or more discs mounted on a rotatable shaft and in alternating interleaved relationship with the filter support members to define a plurality of fluid filtration gaps, each disc having first and second oppositely disposed major faces, each major face having an active area and a peripheral region, the shaft having a longitudinal axis of rotation; each fluid filtration gap being defined by the active area of one of the discs and the active filtration area of the adjacent filter; (c) rotation means for rotating the shaft so that the one or more discs rotate with respect to the filters and a pumping action is created that tends to move fluid in the fluid filtration gaps in a direction away from the longitudinal axis of the shaft; and (d) first feed means for feeding feed fluid to each of the fluid filtration gaps near the longitudinal axis of the shaft; the method comprising providing second feed means in at least one of the one or more discs for feeding fluid adjacent the active area of the first major face of the disc through the active area of the second major face of the disc to the fluid filtration gap defined by that second major face.

The specific design of the rotary filtration device is not critical any design may be used so long as the benefits of this invention can be achieved. Thus, this invention may be used with any of the rotary disc filtration devices disclosed, described, or otherwise referenced in the documents referenced herein, including the patents and applications owned by Membrex, Inc.

In preferred embodiments, each disc is generally planar and has two major faces and a filter is "oppositely disposed" to each major face of a disc, thereby forming two fluid filtration gaps with each disc. In other preferred embodiments, three or more fluid filtration gaps are defined by pluralities of discs and filter support members. In still other preferred embodiments, the discs are mounted on a vertical shaft for rotation, the fluid filtration gaps are contained within the body of fluid to be filtered (which fluid may be contained within a housing), the periphery of the filter support members carry retentate restriction means for restricting the flow of retentate out of the fluid filtration gaps into the body of fluid, and the bottom filter support member has an opening through which fluid to be filtered passes upward and into the fluid filtration gaps. In yet other preferred embodiments, the one or more rotating discs each has one or more spiral grooves in fluid communication with the fluid in the fluid filtration gap.

The term "spiral" may be defined in many ways but one simple definition is that a spiral is the path of a point in a plane moving around a central point in the plane while continuously receding from or advancing toward the central point. A "groove" is a generally elongate depression, hollow, or cavity extending from the surface of the disc or filter to below the surface of the disc or filter, where the length of the groove is generally parallel to the surface. The "spiral groove" need not be a true spiral along the entire length of the groove.

As used herein, the term "oppositely disposed" means that, for example, two surfaces are on opposite sides of the same element, for example, the two major faces of a sheet of paper are oppositely disposed, or that two elements face one another across some gap or boundary, for example, the surface of a disc and the surface of a filter on opposite sides of a fluid filtration gap (that is, defining a fluid filtration gap) are oppositely disposed.

The term "substantially parallel" means that the two lines or planes or elements that are "substantially parallel" do not form an angle with each other greater than about 30 degrees ("substantially parallel" is further defined below).

"Closely spaced" means that two lines or planes or elements are not so far apart that they can not interact or work together to perform a desired function. Thus, in the case of the facing surfaces of the disc and the filter, "closely spaced" usually means that those surfaces are not more than about 100 millimeters apart, and in that context, "closely spaced" is further defined below.

In some embodiments, the one or more discs and also preferably the one or more filter support members are "suspended from" one or more parts of the device that may be collectively regarded as being "the first member." One or more rotating members (one or more of the disc(s) and/or the filter(s)) rotate during filtration. Thus, a "rotatable suspension" must be used for rotatably suspending from the first member the rotatable shaft carrying those one or more rotating members. The rotatable suspension may be any suitable means, for example, bearings, lip seals, dynamic seals, bushings, packing, or packing glands. However, the rotatable suspension will preferably be above the normal level of the fluid to be filtered, thereby eliminating the need for rotary seals and allowing a generally simpler, less costly, and less critical type of rotatable suspension (e.g., a simple rotary bearing) to be used.

The term "suspended from" should be understood to include being attached to, being secured to, depending from, and/or hanging from; should also be understood to include cantilevered suspension; and should also be understood to include suspension that results in any spatial orientation (whether vertical, horizontal, or diagonal) of the discs and filters; and should also be understood to include both direct and indirect suspension (e.g., where a first filter support member is directly suspended from the first member and the second filter support member is directly suspended only from the first filter support member and not from the first member, in which case the second filter support member is said to be indirectly suspended from the first member).

For a device in which the discs and filter support members are suspended from the same unitary member, it is clear that they are suspended from "the first member." However, for some devices, two or more parts (e.g., plates, structural beams, gear box, motor) of the device (some or all of which may or may not be fastened together) may constitute "the first member."

One indication of whether two or more parts of the device collectively constitute "the first member" is whether they can be (but do not necessarily have to be) removed together from one or more other significant parts of the device (e.g., the rest of the device or the rest of the housing or the vessel portion of the device that holds the fluid to be filtered) to remove the disc and filter support members together from the other parts of the device. Accordingly, if the discs and filter support members can be removed together from the device by removing together the one or more device parts from which the discs and filter support members are suspended, those one or more device parts from which the discs and filter support members are suspended can collectively be regarded as "the first member" and the discs and filter support members in this device are "suspended from the first member." Furthermore, in that device "the first member" is considered to be "removable." "Removability" of the first member can allow the filter support members and discs to be removed as a unit, e.g., for maintenance and without having to disassemble the rest of the device.

There is another way to consider whether the discs and/or filter support members are "suspended from the first member," which can be used, for example, for a device in which the discs and filter support members are suspended from one or more parts of the device and those one or more parts of the device are generally not removable from other significant parts of the device. Such a device, for example, may be one where the discs and filter support members hang from the top of a device and the top (which may comprise one or more parts) is non-removable from the rest of the device, including the several legs on which it stands (e.g., stands in a lake or other body of fluid). In this device, the discs and filter support members are also considered to be "suspended from the first member" because the discs and filters are all suspended in cantilevered fashion in "generally the same direction" (because they all hang down from the top).

The direction of suspension is the overall direction of suspension from the supporting member to the supported member, which direction ignores any curves or bends. By "generally the same direction" is meant that the direction of suspension of the discs and the direction of suspension of the filter support members are at no more than an acute angle to each other, i.e., an angle less than 90 degrees, desirably less than 45 degrees, more desirably less than 30 degrees, preferably less than 15 degrees, and most preferably are not at an angle to each other exceeding 5 degrees.

Suspension of discs or filter support members from the first member is not inconsistent with the discs, the filter support members, the assemblage of discs and filter support members, and/or the shaft carrying the discs from contacting or being stabilized by or being attached in some way directly or indirectly to another part of the device or to a part of the "natural vessel" (e.g., the bottom of a lake) holding the fluid to be filtered.

One or more of the filters/filter support members defining a fluid filtration gap may (but do not necessarily) have restriction means for restricting (and also directing) the flow of retentate out of that fluid filtration gap into the body of fluid. Without any restriction means, the retentate leaving the one or more fluid filtration gaps flows into the body of fluid more radially distant from the axis of rotation (longitudinal axis) than the outer periphery of the discs and filter support members. The rotational velocity component of the retentate moving radially outside of the fluid filtration gap(s), which rotational component is imparted by the rotation of the one or more discs or filters, causes the fluid in the body of fluid radially outside the fluid filtration gap(s) to rotate in the same direction as the discs or filters rotate. Rotation of that radially distant fluid, which rotation can be quite vigorous, in turn tends to make it more difficult to accomplish flotation of less dense materials or settling of denser materials in the same vessel, if such flotation is desired. The rotation of that radially distant fluid also tends to cause gas (e.g., air) to be sucked into the fluid to be filtered.

Consequently, controlling the effluent flow of retentate from the peripheries of the fluid filtration gap(s) is generally desirable. Such control may be accomplished by creating a barrier or dam near the outer periphery of the filter support member(s) to significantly restrict the egress of retentate from the fluid filtration gap(s) into the radially distant liquid. A complete barrier would prevent any retentate from leaving the gaps and would substantially prevent any rotation of the radially distant liquid. Because it is usually desirable to allow some retentate to leave the gap(s), openings may be placed in the barrier or dam. Also, directing the flow retentate effluent against the direction of rotation will tend to counteract that rotational velocity component and decrease the tendency of the radially distant fluid to mix or rotate. Means for directing the retentate effluent flow may be openings or nozzles in or on the barrier pointed against the direction of rotation. The openings or nozzles or other means may direct the retentate effluent in any other suitable direction. Using the barrier or dam tends to prevent undue agitation (e.g., swirling) of the body of fluid and allows establishing quiescent zones in the vessel, e.g., to allow flotation of less dense material and settling of denser material. The restriction means may be thought of as not only substantially decoupling the flow pattern in the fluid filtration gap from the flow pattern in the body of feed fluid but also substantially decoupling the pressure in the fluid filtration gap from the pressure in the body of feed fluid. Thus, the restriction means may allow the pressure in the fluid filtration gap(s) to be considerably higher than the pressure in the body of feed fluid.

Desirably, filter support members are used that can be easily put into or removed from their position with respect to the rotatable discs to avoid the need to remove the discs from the shaft to allow removal of the filter support members. Such easily removable filter support members may have any shape but will be generally be D-shaped or circular in plan view. In either case, a cut-out can provide clearance, e.g., for the rotatable shaft on which the one or more discs are mounted. Two generally D-shaped filter support members may be put into position (proximate a disc) so that their straight sides are facing one another, thereby together forming a generally circular assemblage. In that case, each filter support member will have located in the middle of its straight side a generally semi-circular cut-out for the shaft or suspending sleeve. A generally circular easily removable filter support member will usually have a radial cut-out that extends from the periphery to the center of filter support member to provide the necessary clearance for the shaft or sleeve. No matter what the shape of the filter support member, two or more filter support members may be mechanically connected to permit them to be moved as a unit (a filter support member cartridge) into and out of position with respect to the discs.

Other features, aspects, and advantages of the invention will be apparent to one skilled in the art.

BRIEF DESCRIPTION OF THE DRAWINGS

To facilitate further description of the invention, the following drawings are provided in which:

FIG. 3 is a bottom view of a preferred rotary disc used in the device of FIG. 1, showing the spiral grooves;

FIG. 4 is a cross-sectional view of the disc of FIG. 3 taken along line 4—4 of FIG. 3;

Figure 1:
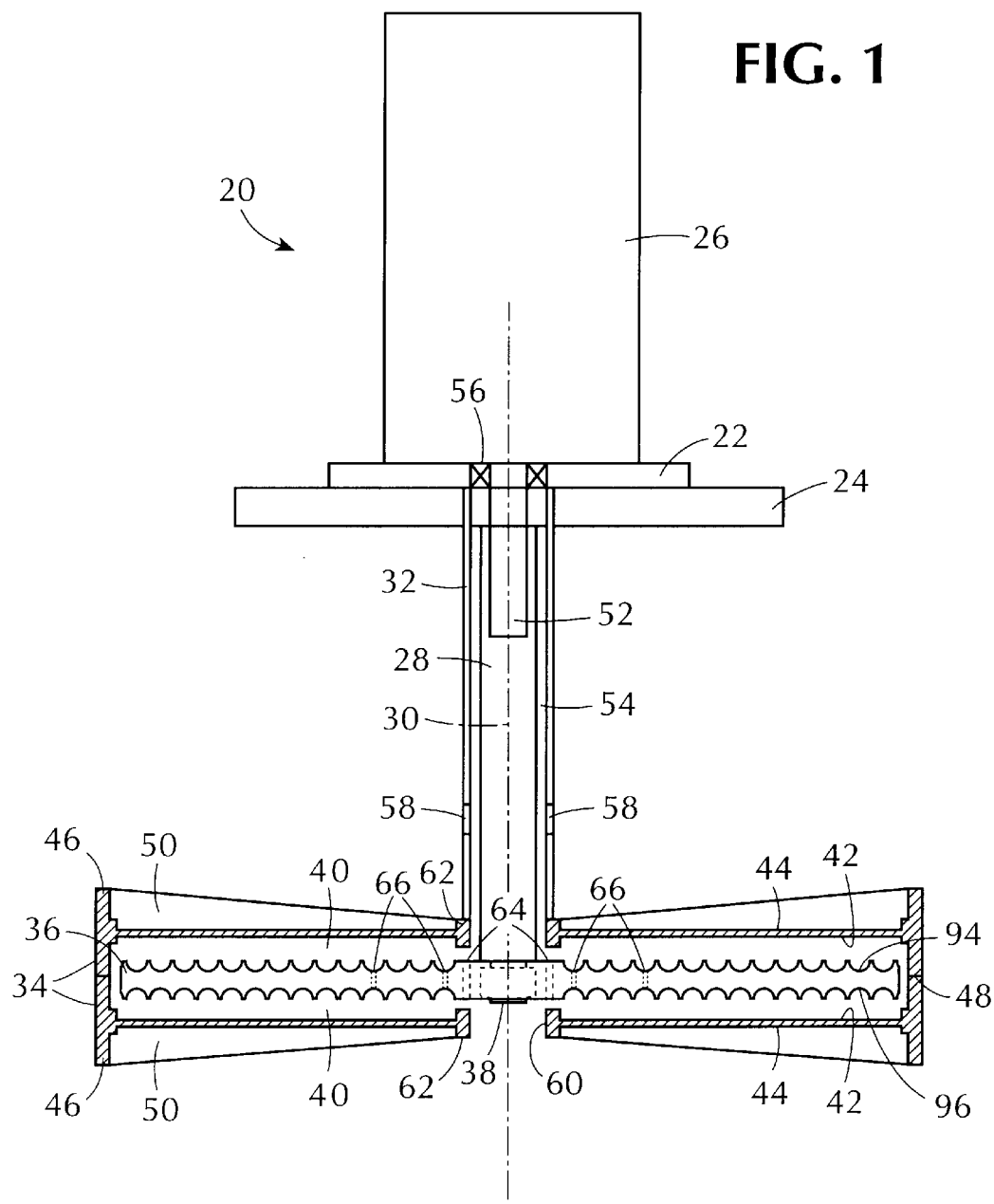
FIG. 1 is an elevational view of a part of a device of this invention having two fluid filtration gaps and without the tank in which the body of feed fluid to be filtered is held.

These drawings are provided for illustrative purposes only and should not be used to unduly limit the scope of the invention.

DETAILED DESCRIPTION OF THE INVENTION

The design of the rotary filtration device of this invention is not critical and any design may be used so long as the device meets the requirements of the claims and affords the benefits of this invention. Thus, it is within the scope of this invention to have a rotating disc surface itself also be at least in part a filter surface although that is not preferred. It is also within the scope of the invention to have two oppositely disposed closely spaced filtration surfaces define the fluid filtration gap and to have one or the other or both of the surfaces rotate, in which case one of the filtration surfaces would be considered to be the disc. Accordingly, use of the term "disc" does not preclude its surface facing and helping to define the filtration gap from also being a filter surface. Similarly, use of the term "filter" to refer to an element through which permeate passes and whose surface is the second surface facing and helping to define the fluid filtration gap does not preclude the filter surface from rotating. Preferably, however, only the discs rotate, the discs do not have filtration capability, the filters (and filter support members, which carry the filters) are not rotatably suspended and therefore do not rotate, and all filtration capability resides in the filters.

If the filter facing and helping to define the fluid filtration gap is to have any grooves or blades or other protuberances, the filter should be rigid enough to hold the requisite shape. In that case, rigid filter materials such as metal (e.g., sintered metal), ceramics, or glass might be suitable. It is preferred, however, that the filter itself not contain any groove or blades and that the disc surface helping to define the fluid filtration gap contain any grooves or blades that are used.

The filter may be made of any material so long as the filter can perform the functions required in accordance with this invention and is otherwise chemically and physically suitable under its respective operating conditions. Accordingly, the filter may be polymeric, metallic, ceramic, or of glass, and may be of any form or shape. Thus, the filter may be formed of particles or of a film or of fibers or of a combination of all three. The filter may be woven or non-woven. Generally, non-woven metal filters have certain advantageous features as compared with polymeric filters: they are easier to sterilize; generally have superior chemical and heat resistance; may be cleaned more easily; and have significantly better structural integrity and rigidity. If two or more filters are used in a device, they may be of the same or different material and filtration or sieving characteristics.

The filter used may be an asymmetric surface filter. An asymmetric surface filter is a filter whose two major faces have different distributions of pore sizes such that the average or median pore size on one face is significantly smaller than the average or median pore size on the other face. Desirably, the asymmetric surface filter is oriented in a device of this invention with the face having the smaller average or median pore size facing the fluid filtration gap and the face with the larger average or median pore size facing away from the gap. A preferred metal filter of this type is the DYNALLOY fiber metal filter marketed by Fluid Dynamics of DeLand, Fla. The use of a metal filter may be advantageous if one or more electric fields are also being used in the device or if the filter is to carry a charge.

One or more electric fields may be applied in axial, or radial, or non-radial non-axial directions. The fields may be useful in aiding separation and can be applied using known technology. As used herein, "axial" means along or parallel to the axis of rotation of the one or more rotating members and "radial" means along or parallel to a radius of the plane of a disc or filter (i.e., perpendicular to the axis of rotation of the one or more members). The field may be the result of direct or alternating voltage, e.g., a high frequency alternating potential. One or more fields in different directions may be applied, which together will result in a single imposed field. One or more fields may be varied as a function of time, e.g., one radial field and one axial field in interleaved on/off synchronization. Thus, the term "an electric field" as used herein should be understood to include all of the foregoing.

The key function of a filter is to freely pass the permeate and not pass the retentate. To do that efficiently, the permeate should adequately "wet" the filter. One indicator of wetting is the contact angle a drop of permeate forms when placed on the filter surface (see U.S. Pat. Nos. 4,906,379 and 5,000,848). Generally speaking, the lower the contact angle, the greater the wetting, and, conversely, the larger the contact angle, the lesser the wetting.

A drop of permeate recovered using a device of this invention will usually have a contact angle on the filter used in that device of less than 45 degrees, desirably less than 40 degrees, more desirably less than 35 degrees, most desirably less than 30 degrees, preferably less than 25 degrees, more preferably less than 20 degrees, and most preferably less than 15 degrees. The contact angle is measured using the method described in U.S. Pat. No. 4,906,379 (see, e.g., column 10, line 42 et seq.) and U.S. Pat. No. 5,000,848 (see, e.g., column 12, line 46 et seq.).

Because water is a high energy liquid, principally because of hydrogen bonding, and because water is often a permeate in filtration processes, hydrophilic filters are preferred for use in the device of this invention. Filters whose surface energy has been increased to increase their hydrophilicity may be used. Thus, filters having a high surface energy (e.g., those of regenerated cellulose and those in accordance with U.S. Pat. No. 4,906,379) are a preferred class of filters. Such filters are more easily wet by polar substances, such as water, but resist wetting by non-polar substances such as organic compounds. Such high energy filter surfaces also have a reduced tendency to become fouled by materials having low energy properties, such as proteins and other organic substances. Preferred filters used in this rotary disc invention are made in accordance with U.S. Pat. No. 4,906,379 and are marketed by Membrex, Inc. under the trademark Ultra-Filic®. The UltraFilic® membrane is made of modified polyacrylonitrile (PAN) and its surface is chemically modified to be extremely hydrophilic ("hyperhydrophilic").

A device of this invention using a filter that allows water to pass (permeate) but rejects oil will find particular use in separating water from oil, e.g., in cleaning up oil spills or in recycling aqueous cleaning solution in a parts washing system. Alternatively, a filter that is relatively hydrophobic (low surface energy) and allows oil to pass and rejects water may be used. Other especially advantageous combinations of the device of this invention and filters having certain inherent properties (e.g., high rejection rate of certain materials but rapid and easy permeation of their co-components in the feed fluid) will be apparent to those skilled in the art. Use of such filters in combination with the device of this invention will provide advantages that may not be achievable without the combination.

The filter may have pores of any size or shape provided they are appropriate for the feed fluid and the permeate and can provide the separation desired. The filter may have a narrow or broad or other distribution of pore sizes and shapes and may be asymmetric and used as an asymmetric surface filter. The filter may have a relatively sharp molecular weight cut-off point.

The filter matrix, and particularly a polymeric filter matrix, may also have ligands attached to it for selective sorption applications (e.g., ion exchange/sorption, affinity sorption, and chelation). Suitable ligands include any ligand capable of attaching to the matrix or to a precursor or a derivative of the matrix.

Preferred ligands comprise (a) ion-selective affinity groups (such as chelator and cage types) that selectively bind inorganic ions and (b) bio-selective affinity groups that selectively bind biologically active substances. The inventory of affinity ligands is large and rapidly increasing. Most often, such ligands are derived from nature (i.e., substances of biological origin) while others are wholly or partially synthetic (i.e., bio-mimic substances). Preferred ligands, preferred methods for attaching ligands to membrane filters, and preferred membrane filters are taught in U.S. Pat. No. 4,906,379. Other useful ligands and methods for attaching the ligands to the filter will be known to those skilled in the arts of affinity sorption, enzyme immobilization chelation, and the like. As used herein the term "selective sorption ligands"includes all of the foregoing ligands.

Almost any fluid to be filtered can be filtered using a device of this invention, but it finds particular use in filtering feeds having high solids content, mixed phase fluids, and biological fluids.

High solids content fluids may be, for example, biological fluids, fluids containing affinity particles (e.g., selective sorption affinity particles), particles of ion exchange resin, catalyst particles, adsorbent particles, absorbent particles, and particles of inert carrier. The inert carrier particles may themselves carry catalyst, resin, reactants, treating agents (e.g., activated charcoal), etc. Mixed phase fluids include liquid/solid, liquid/liquid, and liquid/gas systems. The fluid may contain more than two phases. The liquid phases may all be aqueous or non-aqueous or may be one or more aqueous phases and one or more non-aqueous phases together. The phases may be immiscible, e.g., two aqueous phases that are immiscible because each phase has a different solute. The fluid may have gaseous, liquid, and solid phases. Reaction and/or heat transfer may accompany the filtration process of this invention and take place inside or outside a device of this invention.

Biological fluids are fluids that originate from or contain materials originating from biological organisms (e.g., from the animal or plant kingdoms) or components thereof, including living and non-living things (e.g., viruses). Thus, the term "biological fluids" includes blood; blood serum; plasma; spinal fluids; dairy fluids (e.g., milk and milk products); fluids containing hormones, blood cells, or genetically engineered materials; fluids from fermentation processes (including fermentation broths and reactant, intermediate, and product streams from beer-making and wine-making, and waste water treatment streams); fluids containing or consisting of microbial or viral material, vaccines, plant extracts, or vegetable or fruit juices (e.g., apple juice and orange juice); fluids containing microorganisms (e.g., bacteria, yeast, fungi, viruses); and so forth. The device is particularly useful with fluids containing pressure-sensitive or shear-sensitive components, e.g., cells (blood cells; mammalian hybridomas; pathogens, e.g., bacteria in a fluid sample that are being concentrated to allow detection; etc.). It is useful for filtering fluids containing drugs and precursors and derivatives thereof It is also useful for filtering organic compounds in general (including oils of all types, e.g., petroleum oil and food oil) as single or mixed phases (e.g., oil/water). It is also useful for filtering fluids containing surfactants, emulsions, liposomes, natural or synthetic polymers, waste waters from deburring and polishing operations (e.g., tumbling and grinding fluids), industrial and municipal waste waters, and aqueous, semi-aqueous, and solvent-based cleaners.

A plurality of discs and/or a plurality of filter support members, which carry the filters, may be used in a device according to this invention. Thus, it is within the scope of the invention to have a single disc disposed between two filters, thereby defining two filtration gaps. In such a device, one or both of the major faces of the disc would desirably each have at least one spiral groove. It is also within the scope of this invention for such a device to have several alternating interleaved discs and filter support members, that is, discs and filter support members in alternating arrangement, so that several filtration gaps are defined. In that case, the discs could be mounted on a common shaft for rotation in unison and the permeate from the filters could flow to a common manifold for collection. In a device having a plurality of interleaved discs and filter support members, each surface defining a fluid filtration gap may have one or more spiral grooves.

Regardless of which elements (that is, the filter(s), the disc(s), or combinations thereof) rotate, rotation may be at a constant speed or at varying speeds and in a single direction or in alternating directions. If two or more members rotate, they may rotate in the same or different directions and at the same or different speeds. The rotating member(s) may periodically reverse its or their direction(s) of rotation (i.e., oscillate). At least one of each disc and filter pair defining each fluid filtration gap should rotate with respect to the other. Thus, the filter and disc defining a fluid filtration gap should not rotate in the same direction and at the same speed. Preferably the filter or filters (and therefore the filter support member or filter support members) are stationary and the disc or discs rotate and only in a single direction of rotation. Withdrawal of permeate that passes through the filters is simplified if the filter support members are stationary during filtration.

The disc(s) and/or filter(s) may translate axially (reciprocate) approximately perpendicular to the plane of rotation) whether or not it or they are the rotating element(s). The disc(s) and/or filter(s) also may be vibrated or oscillated to aid filtration.

Each filter is desirably mounted on a filter support member, which functions to support the filter and/or to provide a collection network for the permeate. Such a support is desirable, particularly if the filter does not itself have substantial structural rigidity. Preferably, a network of permeate collection passageways is disposed in the filter support member in fluid communication with the down-stream side of the filter (facing away from the fluid filtration gap) so that permeate passing through the filter flows into the permeate collection passageways. Any method of mounting the filter on the filter support member may be used provided it does not unduly hinder operation of the device. Preferably, the method of mounting the filter does not significantly reduce the active filtration area of the filter but such reduction may be necessary in some cases.

The filter support member may have any size or shape provided that the advantages of the invention can be achieved. Two or more filter support members may be arranged in a plane to form a filter support member assemblage that helps define a fluid filtration gap. Thus, for example, two D-shaped members (with semi-circular cut-outs for the shaft, etc.) may be placed with their straight sides near each other to define a filter support member assemblage having a circular outer periphery.

Desirably, each of the one or more of the filter support members defining a fluid filtration gap can have near its periphery restriction means for restricting (and also directing) the flow of retentate out of that fluid filtration gap into the body of fluid. If the restriction means are high enough (i.e., extend sufficiently away from the plane of the filter support member, e.g., perpendicularly or diagonally away from the plane of the filter support member), they may come close to or touch the adjacent filter support member. In that case, the restriction means may be thought of as forming a wall separating a regime of more intense shear and fluid movement (the fluid between the discs and filter support members, and the fluid between the peripheries of the discs and filter support members and the inside surface of the restriction means) from a regime of less intense shear and fluid movement (the rest of the body of fluid, including the volume radially distant from the outside surface of the restriction means and the volume axially remote from, i.e., axially outside of or beyond, the two outer filter support members).

The restrictions means can also be used to separate a region of higher pressure (an inner region whose outer boundary is the restrictions means and, for example, the two outer filter support members) from a region of lower pressure (the region outside of the inner region, i.e., the body of fluid to be filtered). A higher pressure can be developed in the fluid filtration gap for a given fluid by adjusting the geometry of the device and the rotation speed. The geometry of the device includes the size and shape of the two surfaces defining the gap, the smoothness of those surfaces, the width of the gap, whether there are any grooves or blades or other concavities or convexities on either surface, and, if so, their number, size, shape, and relative position.

If the fluid in the appropriate parts of the regime of less intense shear and fluid movement moves slowly enough and if the fluid properties (e.g., surface tension, viscosity, and density) are satisfactory, flotation and settling may be conducted in this regime. That is useful, e.g., in the separation subsystem of an aqueous parts washing system, where oil removed from the parts by the cleaning solution and particles (e.g., metal filings) carried by the cleaning solution into the separation subsystem can be separated by flotation (the oil) and by settling (the metal filings) from the aqueous cleaner.

The design of the restriction means (if used) is not critical and any configuration, shape, location, or size may be used so long as the restriction means can perform its intended function. Although restriction means unattached to any filter support member could be placed in the device (e.g., a hollow cylindrical member interposed between the periphery of the filter support members and the rest of the body of fluid to be filtered, i.e., between the periphery of the filter support members and the cylindrical wall of the housing), it is preferable for the restriction means to be carried by the filter support members (i.e., for the filter support members to have the restriction means), for example, so that the restriction means can be removed as a unit with the filter support members. Restriction means not carried by the filter support members (e.g., a cylindrical wall) may be suspended from the first member or may be attached to another vessel wall (e.g., the sidewall or bottom of the vessel).

The restriction means may comprise a circular dam or lip located near the outer periphery of the filter support member that projects a sufficient distance from the plane of the filter support member. Thus, the lip may project in only one direction away from the plane of the filter support member (e.g., above) or it may project in both directions away from the plane of the filter support member (i.e., both above and below). Desirably, the filter support members will carry restriction means and those means will substantially isolate the fluid in the high-shear zone from the fluid in the quiescent zone. Compressible means may optionally be used between the restriction means of one filter support member and the appropriate portion of the adjacent filter support member to provide a fluid-tight seal. If the restriction means is carried by the filter support member(s), the restriction means may be but need not be located at the periphery of the filter support member(s); the restriction means should however be radially distant enough to perform the desired function. For example, if the fluid filtration gap is 100 millimeters wide, each filter support member may carry restriction means and those means may project above and below the plane of the filter support member approximately 50 millimeters. Alternatively, the restriction means could project 100 millimeters above the plane of the filter support member and not at all below the plane of the filter support member.

In most cases, it is desirable for retentate to remix with the rest of the body of fluid to be filtered. That remixing may occur, for example, in the body of fluid to be filtered outside the retentate flow restriction means, or just prior to being fed to the fluid filtration gap (e.g., in the annular region between the disc rotating shaft and the sleeve supporting the filter support members), or in the fluid filtration gap itself. Such remixing is desirable for several reasons, including preventing extreme concentration gradients from arising and "washing out"from the fluid filtration gap the solids or other materials that might otherwise tend to accumulate and more rapidly blind or clog the filter.

If the restriction means prevents substantial remixing, it may be necessary to provide retentate flow effluent means (e.g., openings) in the "inner wall" formed by the restriction means to allow the retentate to leave the high shear regime. It may also be desirable to provide retentate flow directing means to direct the flow of the retentate leaving the high shear regime to counteract any undue agitation (e.g., swirling) of liquid in the radially distant volume that would otherwise occur because of the rotation of the rotating members (usually the discs). Accordingly, openings in the inner wall formed by the restriction means may be angled against the direction of rotation of the rotating members or nozzles oriented against the direction of rotation may be provided. Those openings and/or nozzles may also be oriented so that the retentate flow out of them is at an angle to the plane of rotation (e.g., perpendicularly) to achieve other flow patterns within the fluid regime of less shear.

The restriction means for a fluid filtration gap will often block a significant portion of the nominal area occupied by the restriction means. Thus, the percentage of the nominal area blocked by the restriction means will often be at least 85%, usually at least 90%, desirably at least 92%, more desirably at least 94%, most desirably at least 95%, preferably at least 96%, more preferably at least 97%, most preferably at least 98%, and sometimes as much as 99% of the nominal area occupied by the restriction means. In other words, the open area defined by the openings in the restriction means will often be less than 15%, usually less than 10%, desirably less than 8%, more desirably less than 6%, most desirably less than 5%, preferably less than 4%, more preferably less than 3%, most preferably less than 2%, and sometimes less than 1% of the nominal area occupied by the restriction means. For this purpose, the nominal area occupied by the restriction means for a fluid filtration gap is taken to be the inner periphery of the restriction means (which in the case of cylindrical restriction means is its inner circumference) multiplied by the height of the fluid filtration gap. The height of the fluid filtration gap will be taken as the distance from the mid-plane of the disc to the mid-plane of the oppositely disposed filter support member defining that gap.

Feed fluid may be introduced into the fluid filtration gap continuously or in batches. Permeate may be removed continuously or in batches. Retentate may be removed continuously or in batches. Retentate containing one or more species concentrated from the feed fluid may be the desired product, e.g., for testing. The permeate product may be feed fluid from which particulate or other matter that would interfere with subsequent testing has been removed by the filtration device. Testing of the retentate and/or permeate may be for the presence of or concentration of any chemical or biological species or for one or more physical or chemical properties (e.g., pH, temperature, viscosity, extent of reaction, specific gravity, chloride ion, antibodies, bacteria, viruses and other microorganisms, e.g., Cryptosporidium oocysts and Giardia cysts, DNA fragments, sugars, ethanol, and toxic metals, toxic organic materials, and the like). Thus, a device of this invention may further comprise means for physically and/or chemically testing the retentate and/or the permeate, e.g., for one or more of the foregoing species and/or properties (characteristics).

Any method may be used to place fluid to be filtered into the one or more fluid filtration gaps but the fluid will desirably be placed into the gap near the longitudinal axis, i.e., the axis of rotation. Thus, for example, feed fluid may flow through the rotatable shaft or a sleeve around the shaft (forming an annular region between the shaft and the sleeve) and pass out into the fluid filtration gaps through ports in the shaft or the sleeve, or one or more gaps may be immersed in a natural body of fluid (e.g., a pond or lake) or in a body of fluid contained in a vessel (or housing), or two or more of those and other flow schemes may be used.

In a particularly desirable configuration, the retentate leaving one or more fluid filtration gaps is recycled to the fluid filtration gaps. For example, retentate leaving the fluid filtration gaps may be piped to the annular region between (i) the rotatable shaft by which the discs are rotated and (ii) a sleeve around the shaft that supports the filter support members, which annular region may be in fluid communication with one or more of the fluid filtration gaps. The restriction means and suitable piping may be arranged to accomplish that recycle of retentate to the fluid filtration gaps, and some or all of the retentate leaving the fluid filtration gaps may be recycled. Fresh (non-recycle) feed (from the body of fluid to be filtered) can enter the fluid filtration gaps by any suitable means, including by passing through entry ports in the sleeve (if a sleeve is used and is fluidly connected to the fluid filtration gaps) or by passing through an opening in one or more filter support members (e.g., the filter support member farthest from the first member) or by any combination of those and other means. Fresh feed and any recycle retentate may or may not be mixed before entering the fluid filtration gaps. For example, such mixing may occur in the annular region between the sleeve and the shaft or just before entry into one of the fluid filtration gaps.

The vessel or housing to hold the fluid may be part of the device. The housing (including the bottom, top, and/or sides) may be of any size or shape and of any material so long as the housing does not adversely affect performance of the device of this invention. Generally, the housing will be no larger than is reasonably required (1) to house and/or suspend the disc(s) and the filter(s), and (2) to provide a sufficiently large body of fluid to be filtered (if the housing is used to hold the fluid), and (3) to provide sufficient volume for flotation and/or settling (if flotation and/or settling are to be accomplished in the same vessel). A housing need not be used at all or the housing or a part of its bottom, top, and/or sides may be open and the device with the housing may be placed into a body of fluid (e.g., a lake, a fermentation tank) to produce a permeate and/or retentate product, e.g., for testing. Partial or complete immersion of the device can allow fluid to flow into the fluid filtration gap. The pumping action of the device (e.g., caused by the rotation of the disc(s)) can also be used to move the feed fluid into the filtration gap from the body of feed fluid.

A device of this invention may be used in many different ways, e.g., for monitoring a reaction (e.g., by testing, or for producing a testable fluid from, the reaction medium in a reactor or a reactor effluent stream), or as an integral part of a reactor scheme (e.g., for separating catalyst from a reactor effluent stream for recycling to the reactor or for regeneration, or for continuously removing product and/or by-products and/or continuously replenishing nutrients in a cell culture reactor, or in biological waste water treatment (e.g., for retaining the activated sludge used to digest organic matter)), or as part of a recovery scheme (e.g., for separating products, by-products, contaminants, etc. from a reaction or process stream). The device may be located in situ in any type of process vessel (e.g., reactor) or pipeline (e.g., reactor effluent piping or slip-stream piping) for any purpose (e.g., producing a testable fluid) where filtration needs to be performed continuously or intermittently.

Although there are no theoretical upper or lower limits on the diameter of the discs and filters, because of the speed of rotation, which may vary anywhere from under 100 rpm to 1000 rpm or higher, and because of engineering, fabrication, and cost constraints, the rotating member(s) of the filtration device will rarely be more than one or two meters in diameter. Accordingly, to increase the capacity of a device of this invention beyond the capacity provided by discs and filters approximately one or two meters in diameter, it is preferred that the filtration capacity be increased by adding additional discs and/or filters as needed. Regardless of the disc and filter diameters, capacity can always be increased by adding more discs and filters to a single device or by connecting two or more devices in series or parallel.

Discs and/or filter support members may be mounted on a plurality of different suspension means in a common housing, hanging from a common member (e.g., a top), etc. Thus, for example, a housing for containing the body of fluid to be filtered could have two or more rotatable shafts in it, where one or both shafts are suspended from the top or side of the device and each shaft carries one or more discs, and/or one or more sets of filter support members could be suspended from the top or side of the device. A framework (e.g., a top mounted on several legs for standing in a reaction vessel or a lake) could carry two or more rotatable shafts on which two different sets of discs are mounted.

The disc may be made of any material and have any design or shape provided it has the requisite physical and chemical properties so that it can perform its function according to the present invention. Because the disc may be rotated according to the present invention and because it is desirable that the disc not deform during the filtration process, the disc requires a certain minimum structural rigidity. Also, the disc preferably should be relatively inert chemically to the feed fluid. Generally, the disc will be made of metal although other materials such as ceramics, glass, and polymers may be used.

Preferably, the surface of the disc facing the filtration gap, including the inner surface(s) of any grooves in the disc, is relatively smooth (except for the presence of the second feed means). Preferably, the surface of the filter, including any grooves used in the filter, is relatively smooth. A rough surface favors the onset of turbulent flow in the fluid in the filtration gap at lower rotation rates, which flow is energy inefficient and may adversely affect one or more components of the fluid being filtered. Thus, desirably the flow of fluid in the fluid filtration gaps is substantially non-turbulent, preferably essentially non-turbulent, and most preferably completely non-turbulent. It is surprising that although the presence of second feed means, e.g., holes leading from one major face of the disc through the disc to the active area of the other major face of the disc defining the fluid filtration gap, would seem to promote turbulence in the fluid filtration gap, such second feed means are an integral part of this invention, do not destroy the desired substantially non-turbulent flow in the fluid filtration gap, and help provide the benefits of this invention.

Generally, the periphery of the disc and of the filter and of the filter support member will be circular, although other shapes may be used. The center of the filter will desirably coincide with the center of the filter support member, the center of the disc will desirably coincide with the center of the filter and the centers will desirably lie on the axis of rotation of the rotating element(s) and on the longitudinal axes of the disc(s) and filter support member(s). The peripheries of the disc and of the filter support member will usually be approximately the same radial distance from the axis of rotation. Usually one disc surface will face a single filter support member and the peripheries of each will be approximately the same distance from the axis of rotation.

Preferably, the surface of the filter is substantially planar. Depending on the type of filter and its surface, the surface may have microconcavities and microconvexities; however, their presence is not inconsistent with the filter surface being considered to be substantially planar. Furthermore, if the filter surface contains one or more grooves and even if those grooves occupy almost the entire filter surface and have depths of 5 millimeters or more, that will still not prevent the filter surface from being considered to be substantially planar.

Similarly, the disc surface helping to define the fluid filtration gap is preferably also substantially planar, and the presence of microconcavities, microconvexities, and grooves with depths of 5 to 10 millimeters or more will still not prevent the filter surface from being considered to be substantially planar.

Although the disc and filter surfaces are preferably planar (e.g., for ease of fabrication), they need not be planar. For example, either or both may have axial cross-sections that are conical, trapezoidal, or curved. In fact, any shape may be used provided the benefits of this invention can still be achieved. Because the width of the fluid filtration gap may vary radially (i.e., as the distance from the axis of rotation, which is the longitudinal axis of the rotating shaft, varies), the two surfaces defining the gap may, for example, be closer to each other at their centers or at their peripheries. If both surfaces have the same cross-sectional size and shape, they may be oriented so that the gap width is constant, e.g., as where both disc and filter are conical and are nested.

It is preferred that neither the disc nor the filter have any significant non-spiral protuberances (e.g., non-spiral blades or vanes) extending into the fluid filtration gap because their presence will tend to adversely affect, for example, energy efficiency by favoring the onset of turbulence at lower rates of rotation.

Preferably, the disc surface and the filter surface defining the fluid filtration gap will be "substantially parallel," that is, the planes of the two surfaces will not be at an angle to each other exceeding approximately 30 degrees, desirably 20 degrees, more desirably 15 degrees, preferably 10 degrees, and most preferably will not be at an angle to each other exceeding 5 degrees. Even if a member (disc or filter) is, strictly speaking, non-planar (e.g., conical discs and filters), the member still will be considered to have a major plane of its general orientation, and it is that plane which should be used in determining whether the planes are substantially parallel.

A device according to this invention may be oriented horizontally, vertically, or diagonally, that is, the axis of rotation of the disc and/or rotatable filter support members (if any) may be horizontal, vertical, or diagonal. In a vertically oriented device having one disc and one filter, the disc may be above the filter or the filter may be above the disc. Regardless of the number of discs and filters and the orientation of the device, it is desirable that the fluid filtration gap be kept filled with fluid during filtration.

Rotation of the disc(s) and/or filter support member(s) may be achieved using any direct or indirect means, for example, an electric motor, a motor coupled via pulleys and drive belt or by gear transmission, or a magnetic drive. Thus, the rotating members (e.g., the discs) need not be mounted on a shaft that rotates them. Axial translation of the disc(s) or filter support member(s) and vibratory movement may be accomplished using known technology.

In contrast to classic cross-flow filtration devices, the shear rate near the filtration surface and the transmembrane pressure or transmembrane pressure differential ("TMP") in a device of this invention may be made substantially independent of one another. (Despite the fact that the filter used herein need not be a membrane, the term "transmembrane pressure" is used because it is a common term.) A filter system of this invention enables precise control over the separation and can be operated and controlled in a variety of ways. For instance, for a given feed fluid, device geometry, filter, and rate of rotation of the rotating member, the permeate flow can be controlled by a permeate withdrawal (metering) pump (e.g., a peristaltic pump) and the retentate concentration (bulk concentration) controlled by setting the ratio of feed to permeate flow rates. Control of the system can also be achieved with flow control valves and pressure control valves. Some of the advantages of this invention are made possible by the fact that key operating parameters (shear rate, transmembrane pressure, and feed, retentate, and permeate rates) can to a substantial extent be independently controlled and manipulated.

The control system for the filtration device may provide for continuous or batch addition or withdrawal of feed fluid and/or permeate and/or retentate. The design of the peripheral equipment used with the filtration device is not critical. Off-the-shelf technology may be used for the addition, collection, and withdrawal of fluid, for the control system, the rotary drive means, etc. The design and selection of all of this peripheral equipment are within the skill of the art.

Generally, the operating pressure and transmembrane pressure in the device can be any values that do not interfere with the filtration process or adversely affect the feed or product fluids. Thus, a transmembrane pressure only slightly above atmospheric pressure may be used or the transmembrane pressure may be substantially higher. Generally, lower transmembrane pressures are preferred because they tend to minimize solids build-up on the surface of and within the filter. Also, lower operating pressures are generally preferred because they tend to make the equipment less costly. However, in some cases it may be desirable to use higher operating pressures to aid filtration. For instance, when processing carbonated beverages, the operating pressure must be kept sufficiently high to prevent degassing. Higher pressures in the fluid filtration gap may also be desirable to help drive the filtration. Higher pressure in the fluid filtration gap may also allow dispensing with a vacuum pump for removing permeate. It may also be desirable to use other forces, for example, electromotive force, to aid filtration in certain cases.

Desirably one or more spiral grooves are used on one or more of the surfaces defining each fluid filtration gap, and preferably the disc defining each gap rotates and carries one or more spiral grooves and the filter defining each fluid filtration gap does not rotate and does not have any groove.

A groove is a long narrow channel or depression. It may also be thought of as an elongate concavity or depression whose length lies in a plane parallel to the surface in which the groove is located. The term "spiral" may be defined in many ways but one simple definition is that a spiral is the path of a point in a plane moving around a central point in the plane while continuously receding from or advancing toward the central point.

The spiral grooves used herein preferably are but need not be continuous. A surface may have more than one spiral, in which case the spirals may start and/or end at different distances from the center of the surface. If more than one spiral groove is used on a surface, the grooves may cross each other and need not have the same shape or curvature or central point or transverse cross-sectional shape or area. The spirals need not end at the periphery of the surface. The spirals need not be on the rotating member(s). Preferably, however, the one or more spiral grooves used are located on the surface of the disc, the disc rotates, feed is introduced to the fluid filtration gap at or near the axis of rotation, the grooves are true spirals, start near the axis of rotation, extend to the periphery of the disc, and do not cross over each other.

Preferably the grooves are oriented on the surface and the surface is rotated in a direction so that the outer peripheral end of each groove points or faces away from the direction of rotation. That tends to reduce the force of impact of fluid exiting the groove.

The grooves desirably used herein are generally concave in transverse cross-section and usually do not have any convexities. Preferably the inner surface of the transverse cross-section of the groove is a smooth continuous curve, for example, a section of an ellipse or circle or combinations thereof. The groove may also have straight walls and be, for example, triangular, rectangular, or square in cross-section. The transverse cross-section may also have straight and curved portions. A groove used herein preferably is of constant width and depth but those dimensions may vary along the length of the groove.

The ratio of groove width to disc (or filter) radius will usually be from 0.001 to 0.6, preferably from 0.01 to 0.5, and most preferably from 0.01 to 0.4. The width may vary along the groove path length such that the ratio of groove width to radial location changes.

Ratios of groove width to disc (or filter) radius outside the range of 0.001 to 0.6 may be used if the other parameters (e.g., speed of rotation) can be adjusted so that the benefits of this invention are achieved.

The separation between the two surfaces defining the filtration gap and the speed of rotation affect the cleaning action or shear and, hence, the flux. The cleaning action, generally speaking, is inversely related to the gap width. The effect of varying the gap, at least within a certain range, has a measurable but relatively small effect on flux, that is, the relationship between gap width and wall shear (i.e., shear rate at the membrane surface) is not strong. In any case, at some point, the filtration surface and its oppositely disposed disc will be too far apart for rotation of at least one of the members to have any beneficial effect on flux. On the other hand, because of engineering tolerances, among other things, at some point the two surfaces defining the filtration gap will be too close together to allow rotation of one or the other or both members. Accordingly, there is a useful working range of gap widths for any particular filtration device for a given feed fluid. The two oppositely disposed surfaces defining the fluid filtration gap should be "closely spaced" and thus the gap width will usually be within the range of 1 to 100 millimeters, often 1 to 50 millimeters, desirably 1 to 25 millimeters, preferably 1 to 15 millimeters, and most preferably 1 to 10 millimeters. Spacings outside the range of 1 to 100 millimeters may be used if the other parameters can be adjusted so that the benefits of this invention are obtained. The gap width for a given device may vary, e.g., in the case where the disc(s) and/or filter(s) are not planar (for example, two conical surfaces that point towards or away from each other). In other words, the fluid filtration gap can vary radially. Such variation may be useful to help maintain constant average shear stress as feed viscosity increases as a result of concentrating one or more species (e.g., as in dewatering).

The speed of rotation affects the flux: higher rotation rates increase the cleaning action and lower rotation rates decrease the cleaning action. Any speed of rotation may be used that is consistent with the design of the equipment and the shear-sensitivity of the fluid being processed. The speed will usually be from 50 to 2000 rpm, desirably from 100 to 1500 rpm, preferably from 100 to 1200 rpm, and most preferably from 100 to 1100 rpm. Values outside the range of 50 to 2000 rpm may be used provided the benefits of this invention can still be achieved.

Other variables affecting the performance of the device of this invention include, e.g., the number of spiral grooves on the surface, the length, width, and depth of the grooves, their cross-sectional shape, the smoothness of the surfaces defining the filtration gap, and the parameters defining fluid rheology, including fluid viscosity, density, whether it contains particles (e.g., cells), and the size, shape, and concentration of those particles. As explained in U.S. Pat. No. 5,143,630, the angle subtended by a spiral groove (angle Y in FIG. 1 of that patent) and the curvature of the groove (relating to angle T in FIG. 2 of that patent) also affect performance.

Still other variables affecting the performance include the size, shape, and location of any retentate flow restriction means, the number, size, shape, and location of any retentate flow directing means, and whether some or all of the retentate effluent passing through the restriction means is recycled to the fluid filtration gap(s) and, if so, how that is accomplished.

With this background, we turn to the accompanying drawings, which illustrate various embodiments of the present invention.

With reference to FIGS. 1–4, rotary disc filtration device 20 comprises first plate 22, second plate 24, motor 26, shaft 28 having longitudinal axis 30, sleeve 32, two filter support members 34, and rotary disc 36 having first (upper) major face 94 and oppositely disposed second (lower) major face 96. Nut 38 at bottom of shaft 28 locks disc 36 to shaft 28. There are two fluid filtration gaps 40, which are parallel to each other. Each gap is defined by filter 42, which rests on circular plate 44 (which is the major part of filter support member 34), and the corresponding oppositely disposed major face of disc 36. Device 20 may be placed on top of a container (not shown) holding fluid to be filtered so that second plate 24 rests on supports across the top of the container. The upper level of the body of fluid to be filtered would be below the bottom face of second plate 24. Thus, rotatable suspension 56, in which shaft 28 rotates, would not also need to seal against fluid.

Each filter support member 34 has circumferential peripherally located lip 46, which projects above and below plate 44 of filter support member 34. The two lips 46 on the adjacent filter support members meet along a circular path that is radially distant from longitudinal axis 30. Compressible member (e.g., O-ring) 48 lies along that circular path and provides a substantially fluid-tight seal between the two lips 46. Alternatively, lip 46 on one filter support member can be designed to nest within an adjacent filter support member to provide a barrier or fluid-tight seal to restrict the retentate flow. The nesting mechanism may also be used to aid in aligning the filter support members in the proper configuration during assembly of the filter support member/disc assemblage or during assembly of a cartridge of filter support members (described below). A compressible member (e.g., the O-ring) need not be used.

During normal operation, rotation of disc 36 will cause circulation of fluid within each fluid filtration gap 40 and an outward pumping action (i.e., movement of fluid in the gap from longitudinal axis 30 towards circumferential (peripheral) lips 46. Varying pressure differences across (perpendicular to) plates 44 as a function of radial distance from longitudinal axis 30 will tend to cause plates 44 to deform, which in turn will cause the width of the fluid filtration gaps to vary radially. Ribs 50 tend to prevent this flexing (deformation) of plates 44 and thereby tend to maintain relatively constant fluid filtration gap widths. Alternatively, ribs may project radially from sleeve 32 to thereby limit deformation (flexing) of the filter support members.

Drive column 52, which is part of shaft 28, is connected at its upper end to the rotor of motor 26 and is fixedly attached at its lower end to the rest of shaft 28. Annular gap 54 lies between shaft 28 and sleeve 32. Because sleeve 32 is centered with respect to the longitudinal axis of rotation of shaft 28 (i.e., axis 30) and because upper filter support member 34 is connected to and centered with respect to the sleeve, the topmost filter support member is centered with respect to the axis of rotation of the shaft and disc. The lower filter support member is aligned with and connected to the upper filter support member and through its connection to the upper filter support member is connected (indirectly) to sleeve 32. Therefore both filter support members are connected to the "first member," which comprises plates 22 and 24. Sleeve 32 does not rotate. Thus, the filter support members remain stationary and the disc rotates with respect to them when motor 26 rotates shaft 28 on which the disc is fixedly mounted. The rotatable suspension of the rotating member (the disc) from the "first member" is indicated by reference numeral 56 and is above the normal level of the fluid to be filtered when device 20 is placed in the body of fluid to be filtered.

Rotatable suspension 56 is for convenience depicted in FIG. 1 as a rotary bearing mounted in a plate (here, second plate 24); however, the rotatable suspension will often (and sometimes preferably) be the rotary bearing or bearings in the gear box, motor, or other motive means that rotate drive column 52 (which is part of shaft 28) and there will be no rotatable suspension in any of the plates (i.e., the drive column or shaft will pass through a hole in the plates without any bearing being located at that point).

Holes 58 in the sidewall of sleeve 32 (typically four holes, only two of which are shown, but more or less may be used) allow fluid to flow into and/or out of gap or annular region 54 between sleeve 32 and shaft 28 from and/or to the body of fluid in which the device is immersed. Annular region 54 is in fluid communication with upper fluid filtration gap 40 and, via means discussed below, is also in fluid communication with lower fluid filtration gap 40.

Centrally located circular opening 60 in each of filter support members 34 is defined by its inner rim 62. Shaft 28 extends through the central opening in the upper filter support member 34, and central opening 60 in lower filter support member 34 allows the fluid to be filtered to enter the upper and lower fluid filtration gaps 40 (during the filtration operation, device 20 is immersed in the fluid to be filtered to a level below second plate 24). Fluid entering through opening 60 in the bottom filter support member flows readily into the lower fluid filtration gap 40. Holes 64 are present in the inactive area of disc 36 and holes 66 (second feed means) are present in the active area of the disc. Dotted circle 68 in FIG. 3 indicates the inner periphery of the active area of disc 36. In this embodiment, the active area of the disc is the same as the grooved area of the disc, since the grooved area is present on each disc face directly opposite to the active filtration area of the respective filter.

Figure 2:
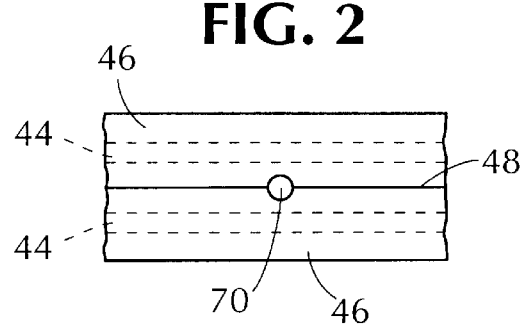
FIG. 2 is an enlarged partial view showing a portion of the restriction means to restrict the flow of retentate out of the fluid filtration gaps.

Semicircular openings in the circumferential lip 46 of upper filter support member 34 are aligned with identical openings in the circumferential lip 46 of lower filter support member 34 to form circular openings 70 in the "inner wall" formed when the two filter support members lie adjacent to one another with compressible member 48 in between as shown in FIG. 2. These openings 70 allow retentate to leave fluid filtration gaps 40. There may be a gap in compressible member 48 where each of the circular openings 70 is formed by the semicircular openings in circumferential lips 46 so that the circular openings are not partially blocked by compressible member 48 (which would otherwise horizontally bisect them).

With reference to FIG. 1, inner rim 62 of upper filter support member 34 is attached to sleeve 32. That attachment may be made using any suitable semi-permanent fastening means (for example, pins, bolts, or screw threads) or any permanent fastening means, if desired (e.g., adhesive), although semi-permanent fastening means are preferred so that the upper filter support member can be detached from the sleeve. Lower filter support member 34 is maintained adjacent to upper filter support member 34 with the semi-circular openings in the two filter support members aligned properly by bolts (not shown) that pass through corresponding bolt holes (not shown) located in lip 46 of each of the two filter support members. The openings in each of the two filter support members that form circular openings 70 (FIG. 2) are evenly spaced around peripheral lips 46. Ribs 50 are also evenly spaced around each filter support member 34.

FIG. 3 shows the bottom face of disc 36 of FIG. 1, and FIG. 4 is a cross-sectional view of that disc taken along line 4—4 of FIG. 3. Disc 36 having rim 72 is attached to the bottom of shaft 28 (FIG. 1) by nut 38. The center of disc 36 coincides with the center of each of the two filter support members 44 and longitudinal axis 30 of shaft 28 (FIG. 1). The bottom face of the disc (FIG. 3 and the right side of FIG. 4) and the top face of the disc (the left side of FIG. 4) each have 15 equally spaced spiral grooves 74 spaced 24 degrees apart. Dotted line 76 indicates the bottom of one of the spiral grooves, which are separated from each other by spiral lands 78. Spiral grooves 74 terminate at their outer ends at rim (periphery) 72 and at their inner ends at an ungrooved central portion. Disc 36 is generally symmetrical about mid-plane 80, with the following major exception. Cavity 82 terminates before reaching the top face of disc 36 (the left side in FIG. 4), otherwise nut 38 would not be able to secure disc 36 to the bottom of shaft 28.

On the lower major face of the disc (FIG. 3), dotted circle 68 separates the central portion, which is the disc's inactive or non-active area, from the disc's active area, which contains the spiral grooves. With reference also to FIG. 1, the disc's upper active area (the active area on the upper major face) is oppositely disposed to filter 42 on top filter support member 44, and the disc's lower active area (the active area on the lower major face) is oppositely disposed to filter 42 on lower filter support member 44. On each of the two major faces, the active area is bounded near the disc's longitudinal axis 30 by imaginary circle 68 and by outer peripheral region (rim) 72. Holes 64, which are within the inactive area of the disc, are not oppositely disposed to either upper or lower filter 42. Holes 66, which are within the active area of the disc, are oppositely disposed to both upper and lower filters 42. (So as to not make FIG. 4 confusing, holes 66, which are shown in FIGS. 1 and 3, are not shown in FIG. 4.)

Figure 5:
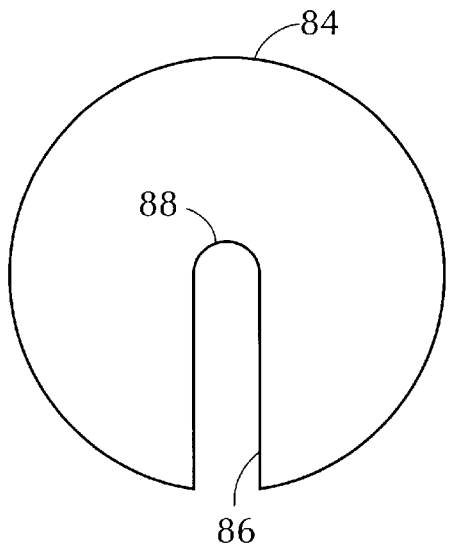
FIG. 5 is a schematic plan view of a preferred filter support member having a generally circular periphery and an elongate cut-out to provide clearance for the shaft.

FIG. 5 shows a schematic plan view of one possible filter support member having generally circular periphery 84 and radial cut-out 86 terminating at its inner end in opening 88. The radial cut-out allows the filter support member to be moved in a direction generally perpendicular to the sleeve and shaft on which the discs are mounted, as described in U.S. Pat. No. 5,254,250. Thus, each filter support member can be detached from and removed from the assemblage of interleaved alternating discs and filter support members without having to remove the discs and filter support members in alternating sequence.

Figure 6:
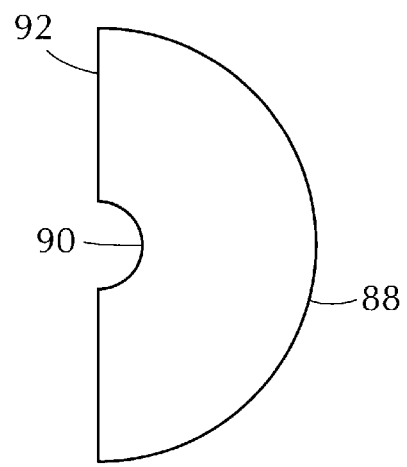
FIG. 6 is a schematic plan view of a preferred filter support member having a "D"shape and a central semi-circular cut-out to provide clearance for the shaft.

FIG. 6 is a schematic plan view of another possible filter support member used in the present invention. This D-shaped filter support member has semicircular outer periphery 88, centrally located semicircular cut-out 90, and straight portion 92. Two such D-shaped filter support members may be arranged as in FIG. 7 with their straight sides near to or contacting one another (a gap between the two straight sides would allow retentate to flow from stage to stage). This D-shaped configuration also allows each of the filter support members to be added to or removed from the assemblage of discs and filter support members without having to remove any of the discs from the shaft. Thus, the filter support members need not be unitary members and any size and shape may be used to form the filter support member surface that supports a filter defining a fluid filtration gap (with its oppositely disposed disc).

Figure 8:
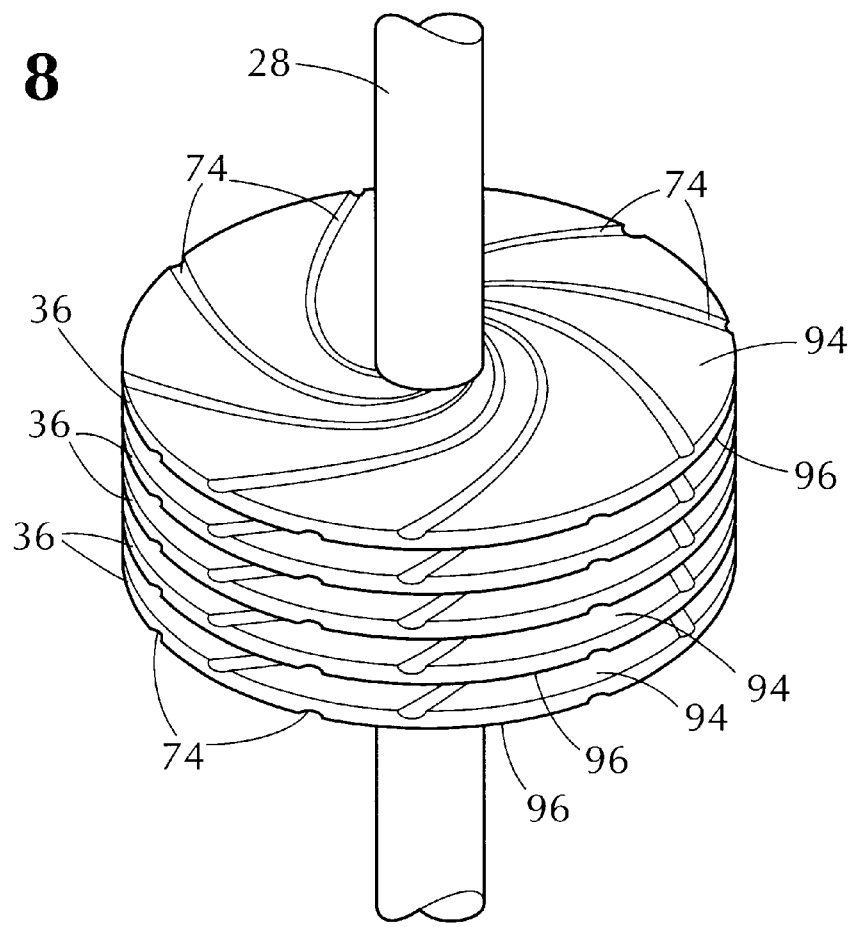
FIG. 8 shows a rotatable shaft carrying five discs, each disc having two major oppositely disposed major faces and each face having spiral grooves, which assemblage may be used in a device having a multiplicity of alternating interleaved discs and filters.

FIG. 8 shows a multiplicity of discs 36 mounted on shaft 28. Each disc has several spiral grooves 74 on each of its first major face 94 and second major face 96.

Figure 9:
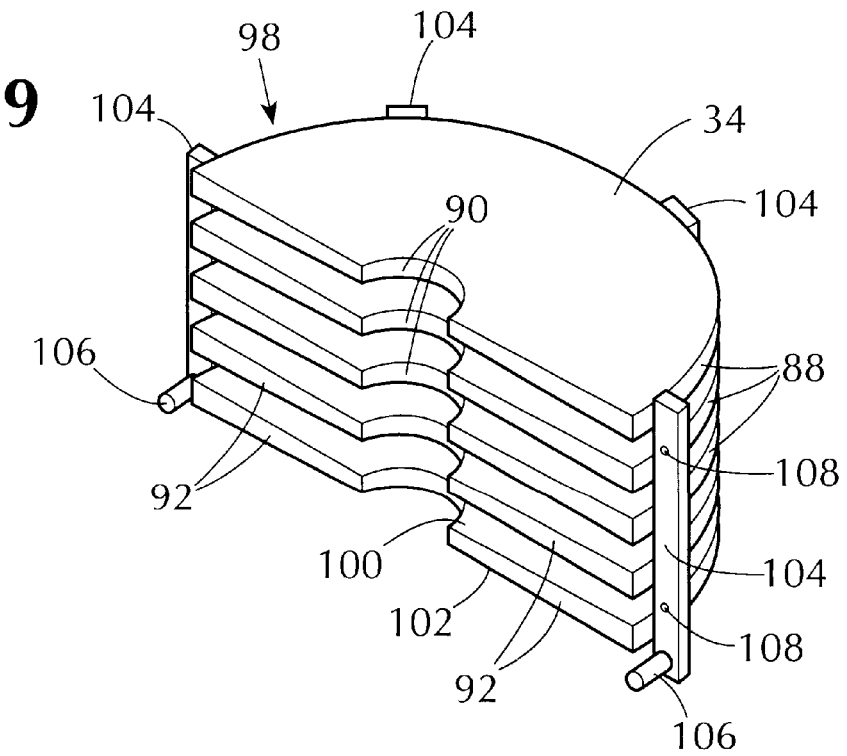
FIG. 9 shows a cartridge comprising five D-shaped filter support members, which members are structurally connected so that they can be moved into and out of a rotary disc filtration device as a unit and which are also fluidly connected so that permeate from all five of the filter support members flow to two headers and can be removed through common nozzles.

FIG. 9 shows assemblage (cartridge) 98 of five D-shaped filter support members of FIG. 6. Each D-shaped member has straight side 92, semicircular periphery 88, central semicircular cutout 90, first (upper) major face 100, and second (lower) major face. The rotatable shaft 28 will be located in the elongate central passageway defined by the circular holes formed by semicircular cutouts 90 when a similar mirror-image cartridge is brought next to cartridge 98 (straight sides 92 proximate the straight sides of the mirror-image cartridge) in the assembled rotary disc filtration device. The five D-shaped filter support members of cartridge 98 are mechanically connected to each other by members 104. Two of members 104 also fluidly connect the filter support members to each other for common permeate removal through nozzles 106. Cartridge 98 may be mounted in the rotary filtration device using bolts (not shown) that pass through bolt holes 108 in two of members 104. Each cartridge of filter support members may be moved as a unit into position with respect to the discs that help to define the fluid filtration gaps.

In these drawings, the devices depicted are all vertically oriented (shaft 28 is vertically oriented), it is the topmost filter support member that is attached (directly) to the "first member" (which comprises first plate 22 and second plate 24), the bottommost and the topmost member is attached to a sleeve around the shaft that rotates the disc. However, as previously noted, the device need not be vertically oriented. Furthermore, it need not be the first filter support member in the assemblage of filter support members and discs that is attached to the first member and the one or more filter support members need not be attached to such a sleeve.

EXAMPLE

Figure 7:
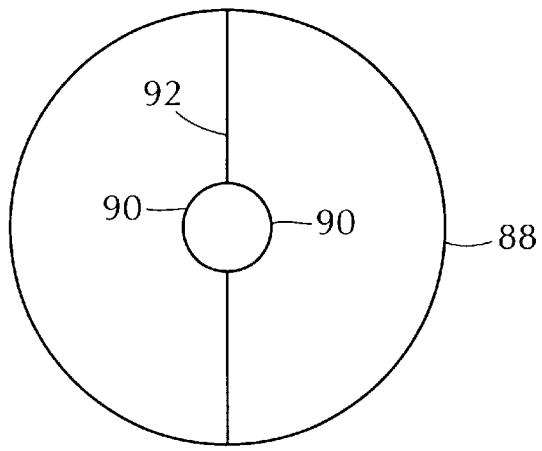
FIG. 7 shows two of the filter support members of FIG. 6 placed together.

Runs were made using a device similar to that shown in FIG. 1, one major difference being that the experimental device had two D-shaped filter members forming a complete essentially circular filter member surface above the rotating disc and two D-shaped filter members forming a complete essentially circular filter member surface below the rotating disc (see FIG. 7). The outer diameter of each "circular" filter formed by the two D-shaped filters was 14.625 inches and the central circular clearance region (the opening in FIG. 7 formed by the two semi-circular cutouts 90) of each was about 2.687 inches in diameter. The filters used on each of the four filter support members were Membrex's Ultra-Filic® filter.

Pressure sensors were placed above and below the rotary disc underneath the respective filters at four different radial distances from the longitudinal axis (center or axis of rotation) of the shaft on which the disc was mounted. Those four radial distances were approximately 2.5 inches (an imaginary circle of 5-inch diameter whose center is the longitudinal axis of the shaft), 3.75 inches (an imaginary circle of 7.5-inch diameter), 4.75 inches (an imaginary circle of 9.5-inch diameter), and 6 inches from the longitudinal axis (an imaginary circle of 12-inch diameter). Thus, for example, the innermost pair of sensors (one under the filter above the upper fluid filtration gap and one under the filter below the lower fluid filtration gap) was 2.5 inches from the axis of rotation (or on an imaginary circle of 5-inch diameter).

Each disc had spiral grooves on each of its two major faces, as shown in FIG. 3, and was rotated at 600 rpm, with water as the process fluid. The pressure in the gaps caused water to pass through the filters (permeate) and for both permeate and retentate to try to leave the system. The upper gap width (between the top of the disc and the oppositely disposed filter surface) was set at 0.36 inches and the lower gap width (between the top of the disc and the oppositely disposed filter surface) was set at 0.08 inches.

Each disc was approximately 13.75 inches in diameter. The central, ungrooved portion of the disc was about 2.75 inches in diameter. In other words, the spiral grooves commenced at about 2.75 inches in diameter (where the ungrooved central portion ended) and the grooves terminated at the periphery of the disc (13.75 inches in diameter).

Four holes (0.3-inch diameter) were symmetrically located in the central, ungrooved portion of each disc at 90 degree angles to one another, with the north-south holes being about 2 inches apart and the east-west holes being about 2 inches apart. In some runs, the central holes were plugged. Different discs had different numbers and locations of 0.3-inch diameter holes running from the active (spiral grooved) area of one major face of the disc to the active (spiral grooved) area of the other major face of the disc. The innermost set of holes (when used) in the active area was along an imaginary circle superimposed on the disc and having a diameter of 3.21 inches. In other words, the innermost holes were at a radial distance from the center of the disc (the axis of rotation) of about 1.6 inches. The other three sets of holes (when used) were along imaginary circles having diameters of 4.97 inches, 7.91 inches, and 10.75 inches. The holes along each imaginary circle were evenly spaced. In other words, if five holes were used for one of the imaginary four circles, the holes were about 72 degrees (360 divided by 5) apart.

Using the difference between the upper and the lower pressures at each of the four radial positions and making various assumption, the net force on each disc was calculated. The results are shown in the table below.

| Run | Hole Configuration | Pressure Difference (Top minus Bottom (PSI)) | | | | Calculated Net Force (Pounds) |
| --- | --- | --- | --- | --- | --- | --- |
| | | At 5" | At 7.5" | At 9.5" | At 12" | |
| 1 | no holes in active area; lower face of disc rubs | 1.23 | 1.68 | 2.28 | 0.79 | 209.1 |
| 2 | five holes at 3.21" diameter; retentate line plugged | 1.12 | 1.15 | 1.06 | 0.64 | 128.8 |
| 3 | five holes at 3.21" diameter | 0.16 | −0.15 | 0.01 | 0.26 | 5.4 |
| 4 | five holes at 7.91" diameter | 0.20 | −0.31 | −0.05 | 0.17 | −3.7 |
| 5 | five holes at 3.21"; five holes at 7.91"; central holes plugged | 0.15 | −0.30 | −0.05 | 0.26 | −3.0 |
| 6 | five holes at 3.21", five holes at 4.97"; five holes at 7.91"; central holes plugged | 0.17 | −0.33 | −0.06 | 0.23 | −4.5 |
| 7 | five holes at 3.21", five holes at 4.97"; five holes at 7.91" | 0.10 | −0.27 | −0.04 | 0.16 | −4.8 |
| 8 | five holes at 3.21"; five holes at 10.75" | 0.21 | −0.14 | 0.04 | 0.25 | 7.8 |

In run 1, the force pushing the disc down towards the smaller gap is over two hundred pounds. Continued operation would put undue stress on the bearings in which the shaft rotates. Furthermore, the rubbing of the disc against the lower filters would cause premature wear and possible failure and significantly reduce the efficiency of the filtration occurring in the lower fluid filtration gap. Note that the downward pressure is very high despite the presence of the four holes in the central (inactive) area of the disc.

In run 2, addition of just five small holes in the active area of the disc but with the retentate line plugged (to prevent retentate removal), which in essence increases the back-pressure on the system, still reduced the downward pressure on the disc by about 40%.

In run 3, which is the same as run 2 except that the retentate line is no longer plugged, the downward pressure on the disc has been reduced to just 5.4 pounds. In other words, addition of just five small holes at a diameter of 3.21 inches (about 0.23 R, where R is the radius of the disc), reduces the downward pressure from 209.1 pounds to 5.4 pounds, a reduction of about 98%.

In run 4, five holes in the active area of the disc are again used but lie along an imaginary circle 7.91 inches in diameter (a circle of 0.56 R, where R is the radius of the disc). The pressure on the disc, instead of being a downward pressure, is now an upward pressure of about 3.7 pounds.

In run 5, two sets of five holes each are used, one set at 3.21 inches (diameter) and the second set at 7.91 inches (diameter). The central holes in the inactive area are plugged. The upward pressure on the disc is about 3 pounds.

In run 6, a third set of holes in the active area has been added at 4.97 inches diameter. The holes in the central, inactive area are again plugged. The upward pressure on the disc is about 4.5 pounds.

Run 7 is identical to run 6 except that the central holes are not plugged. The upward pressure on the disc is about 4.8 pounds, which is essentially the same as the upward pressure on the disc in run 6. This shows that the holes in the central, inactive area of the disc make no difference. In other words, the problem of uneven axial forces is not alleviated at all by the use of holes in the central, inactive area of the disc.

Run 8 has two sets of holes in the active area of the disc, one set at 3.21 inches and the second set at 10.75 inches. The pressure on the disc is mildly downward, namely, 7.8 pounds. Comparison of this run with run 3 (downward pressure of 5.4 pounds) suggests that the additional of the second set of holes at the larger diameter makes little difference.

Broadly, the second feed means (holes) in the active area of the disc will generally be along an imaginary circle of at least about 0.1 R, where R is the radius (or equivalent circular radius, if the disc is not circular), desirably along an imaginary circle of at least about 0.25 R, and sometimes along an imaginary circle of at least about 0.5 R or sometime even 0.75 R. The number of holes along each circle will desirably be at least 2, preferably at least 3, and most preferably at least 5. The holes are desirably evenly spaced along the imaginary circle. Holes along more than one imaginary circle may be used (for example, at about 0.25 R and at about 0.5 R). It is surprising that holes in the active area in accordance with this invention can provide the benefits of this invention, in view of the teachings in the art that the active area of the disc (e.g., the grooved area) should not contain any concavities or roughness so as to try to avoid turbulence.

Variations and modifications will be apparent to those skilled in the art and the following claims are intended to cover all variations and modifications falling within the true spirit and scope of the invention.

We claim:

1. A rotary disc filtration device for filtering feed fluid in a fluid filtration gap into permeate and retentate, the device comprising:
   (a) a filter support member having a major face, the major face having a filter with (i) an active filtration area, (ii) a peripheral region, and (iii) a longitudinal axis substantially perpendicular to the active filtration area;
   (b) a disc having first and second oppositely disposed major faces, the second major face having (i) an active area, (ii) a peripheral region, and (iii) a longitudinal axis substantially perpendicular to the active area; the active area of the disc and the active filtration area of the filter defining the fluid filtration gap therebetween, fluid passing from the fluid filtration gap through the active filtration area of the filter being the permeate and fluid not passing through the active filtration area of the filter being the retentate, the active area of the disc having at least one spiral groove in fluid communication with the fluid when fluid is in the fluid filtration gap, the spiral groove subtending an angle Y in polar coordinates of at least ten degrees on the second major face of the disc;
   (c) rotation means for rotating either the disc or the filter around the respective longitudinal axis or for rotating both so that the disc and filter rotate with respect to each other and a pumping action is created that tends to move fluid in the fluid filtration gap from near the longitudinal axis of the filter towards its peripheral region;
   (d) first feed means for feeding feed fluid to the fluid filtration gap near the longitudinal axis of the filter; and
   (e) second feed means in the disc for feeding fluid adjacent the first major face of the disc through the active area of the second face of the disc to the fluid filtration gap.

2. The device of claim 1 wherein the rotation means comprises a shaft on which the disc is mounted and rotation of the shaft thereby rotates the disc, and the first feed means comprises means for introducing feed fluid into the shaft and passageways through the shaft for conducting feed fluid in the shaft to the fluid filtration gap.

3. The device of claim 1 wherein the rotation means comprises a shaft on which the disc is mounted and rotation of the shaft thereby rotates the disc, the shaft is surrounded by a sleeve, thereby forming an annular region between the shaft and the sleeve, and the first feed means comprises means for introducing feed fluid into the annular region and passageways through the sleeve for conducting feed fluid in the annular region to the fluid filtration gap.

4. The device of claim 1 wherein the active area of the disc is bounded by an inner border near the longitudinal axis of the second major face, the portion of the second major face between the longitudinal axis and the inner border being inactive area, and wherein the first feed means comprises at least one passageway through the disc leading from an opening in the first major face to an opening in the inactive area of the second major face.

5. The device of claim 1 wherein the spiral groove subtends an angle Y in polar coordinates of at least forty-five degrees on the second major face of the disc.

6. The device of claim 1 wherein the spiral groove subtends an angle Y in polar coordinates of at least ninety degrees on the second major face of the disc.

7. The device of claim 1 wherein the spiral groove subtends an angle Y in polar coordinates of at least one hundred eighty degrees on the second major face of the disc.

8. The device of claim 1 further comprising a plurality of the filter support members and/or a plurality of the discs in interleaved relationship and a plurality of fluid filtration gaps, each gap being defined by the active area of a disc and the active filtration area of a filter support member.

9. The device of claim 8 wherein the rotation means rotates all the discs in unison or all the filters in unison.

10. The device of claim 1 wherein the fluid filtration gap width varies radially as measured from the longitudinal axis of the filter.

11. The device of claim 1 wherein the active filtration area and the active area of the disc are spaced apart not more than 100 millimeters and are at an angle to each other not greater than 30 degrees.

12. The device of claim 1 further comprising a first member wherein the filter support member is suspended directly from the first member.

13. The device of claim 1 further comprising a first member and a plurality of filter support members wherein one of the filter support members is suspended directly from the first member and the other filter support members are suspended indirectly from the first member by being suspended from the first filter support member.

14. The device of claim 1 further comprising restriction means for restricting the flow of retentate out of the fluid filtration gap.

15. The device of claim 1 comprising a plurality of filter support members, thereby helping to define a plurality of fluid filtration gaps, wherein those filter support members are mechanically connected so that they can be moved as a unit into and out of their normal operating position in the device.

16. The device of claim 1 wherein the filter support member is generally D-shaped.

17. The device of claim 1 wherein the filter support member is generally circular and has a radial cut-out.

18. The device of claim 1 wherein the second feed means comprises one or more holes through the disc, wherein each such hole is located at least 0.1 R from the longitudinal axis of the disc, where R is the equivalent circular radius of the disc.

19. The device of claim 1 wherein the second feed means comprises one or more holes through the disc, wherein each such hole is located at least 0.25 R from the longitudinal axis of the disc, where R is the equivalent circular radius of the disc.

20. A rotary disc filtration device for filtering feed fluid in one or more fluid filtration gaps into permeate and retentate, the device comprising:

(a) one or more filter support members each having first and second oppositely disposed major faces, each major face having a filter with (i) an active filtration area, (ii) a peripheral region, and (iii) a longitudinal axis substantially perpendicular to the active filtration area;

(b) one or more discs mounted on a rotatable shaft and in alternating interleaved relationship with the filter support members to define a plurality of fluid filtration gaps, each disc having first and second oppositely disposed major faces, each major face having an active area and a peripheral region, the shaft having a longitudinal axis of rotation; each fluid filtration gap being defined by the active area of one of the discs and the active filtration area of the adjacent filter, fluid passing from each fluid filtration gap through the active filtration area of the one or more filters being the permeate and fluid not passing through the active filtration area of the one or more filters being the retentate; the active area of the second major face of each of the one or more discs having at least one spiral groove in fluid communication with the fluid when fluid is in the fluid filtration gap defined by the second major face, the spiral groove subtending an angle Y in polar coordinates of at least ten degrees on the second major face of the disc;

(c) rotation means for rotating the shaft so that the one or more discs rotate with respect to the filters and a pumping action is created that tends to move fluid in the fluid filtration gaps in a direction away from the longitudinal axis of the shaft;

(d) first feed means for feeding feed fluid to each of the fluid filtration gaps near the longitudinal axis of the shaft; and (e) second feed means in at least one of the one or more discs having a spiral groove for feeding fluid adjacent the active area of the first major face of the disc through the active area of the second major face of the disc to the fluid filtration gap defined by that second major face.

21. The device of claim 20 wherein the shaft is surrounded by a sleeve, thereby forming an annular region between the shaft and the sleeve, and the first feed means comprises means for introducing feed fluid into the annular region and passageways through the sleeve for conducting feed fluid in the annular region to the fluid filtration gaps.

22. The device of claim 20 wherein the active area of the second major face of at least one disc is bounded by an inner border near the longitudinal axis of the second major face, the portion of the second major face between the longitudinal axis and the inner border being inactive area, and wherein the first feed means comprises at least one passageway through the disc leading from an opening in the first major face to an opening in the inactive area of the second major face.

23. The device of claim 20 wherein the spiral groove subtends an angle Y in polar coordinates of at least forty-five degrees on the second major face of at least one disc.

24. The device of claim 20 wherein the spiral groove subtends an angle Y in polar coordinates of at least ninety degrees on the second major face of at least one disc.

25. The device of claim 20 wherein the spiral groove subtends an angle Y in polar coordinates of at least one hundred eighty degrees on the second major face of at least one disc.

26. The device of claim 20 further comprising a first member wherein one of the one or more filter support members is suspended directly from the first member.

27. The device of claim 20 further comprising a first member and a plurality of filter support members wherein one of the filter support members is suspended directly from the first member and the other filter support members are suspended indirectly from the first member by being suspended from the first filter support member.

28. The device of claim 20 further comprising restriction means for restricting the flow of retentate out of the fluid filtration gaps.

29. The device of claim 20 comprising a plurality of filter support members wherein the filter support members are mechanically connected so that they can be moved as a unit into and out of their normal operating position in the device.

30. The device of claim 20 wherein each of the one or more filter support members is generally D-shaped.

31. The device of claim 20 wherein each of the one or more filter support members is generally circular and has a radial cut-out.

32. The device of claim 20 wherein the second feed means comprises one or more holes through at least one of the one or more discs, wherein each such hole is located at least about 0.1 R from the longitudinal axis of the shaft, where R is the equivalent circular radius of that disc.

33. The device of claim 20 wherein the second feed means comprises one or more holes through at least one of the one or more discs, wherein each such hole is located at least about 0.25 R from the longitudinal axis of the shaft, where R is the equivalent circular radius of that disc.

34. A rotary disc filtration device for filtering feed fluid in one or more fluid filtration gaps into permeate and retentate, the device comprising:

(a) one or more filter support members each having first and second oppositely disposed major faces, each major face having a filter with (i) an active filtration area, (ii) a peripheral region, and (iii) a longitudinal axis substantially perpendicular to the active filtration area;

(b) one or more discs mounted on a rotatable shaft and in alternating interleaved relationship with the filter support members to define a plurality of fluid filtration gaps, each disc having first and second oppositely disposed major faces, each major face having an active area and a peripheral region, the shaft having a longitudinal axis of rotation; each fluid filtration gap being defined by the active area of one of the discs and the active filtration area of the adjacent filter fluid passing from each fluid filtration gap through the active filtration area of the one or more filters being the permeate and fluid not passing through the active filtration area of the one or more filters being the retentate; the active area of the second major face of each of the one or more discs having at least one spiral groove in fluid communication with the fluid when fluid is in the fluid filtration gap defined by the second major face, the spiral groove subtending an angle Y in polar coordinates of at least ten degrees on the second major face of the disc:

(c) rotation means for rotating the shaft so that the one or more discs rotate with respect to the filters and a pumping action is created that tends to move fluid in the fluid filtration gaps in a direction away from the longitudinal axis of the shaft;

(d) first feed means for feeding feed fluid to each of the fluid filtration gaps near the longitudinal axis of the shaft; and (e) second feed means in at least one of the one or more discs having a spiral groove for feeding fluid adjacent the active area of the first major face of the disc through the active area of the second major face of the disc to the fluid filtration gap defied by that second major face, the second feed means comprising one or more holes through the disc, wherein substantially all of those holes in each disc are located at least about 0.1 R from the longitudinal axis of the shaft, where R is the equivalent circular radius of that disc.

35. The device of claim 34 wherein the active area of each major face of the one or more discs defining a fluid filtration gap has at least one spiral groove in fluid communication with the fluid when fluid is in the fluid filtration gap defined by that major face.

36. The device of claim 35 wherein at least one of the one or more spiral grooves subtends an angle Y in polar coordinates of at least ninety degrees on the second major face of the disc.

37. The device of claim 34 wherein the spiral groove subtends an angle Y in polar coordinates of at least forty-five degrees on the second major face of the disc.

38. The device of claim 34 wherein the spiral groove subtends an angle Y in polar coordinates of at least ninety degrees on the second major face of the disc.

39. A method for reducing the tendency for a rotary disc and a filter in a rotary disc filtration device to be forced together by the pumping action caused by the rotation of the disc or filter during the filtration process, the rotary disc filtration device comprising: (a) a filter support member having a major face, the major face having a filter with (i) an active filtration area, (ii) a peripheral region, and (iii) a longitudinal axis substantially perpendicular to the active filtration area; (b) a disc having first and second oppositely disposed major faces, the second major face having (i) an active area, (ii) a peripheral region, and (iii) a longitudinal axis substantially perpendicular to the active area; the active area of the disc and the active filtration area of the filter defining the fluid filtration gap therebetween, the active area of the disc having at least one spiral groove in fluid communication with the fluid when fluid is in the fluid filtration gap, the spiral groove subtending an angle Y in polar coordinates of at least ten degrees on the second major face of the disc; (c) rotation means for rotating the disc or the filter with respect to the other, thereby creating a pumping action that tends to move fluid in the fluid filtration gap from near the longitudinal axis of the filter towards its peripheral region; and (d) first feed means for feeding feed fluid to the fluid filtration gap near the longitudinal axis of the filter; the method comprising providing second feed means in the disc for feeding fluid adjacent the first major face of the disc through the active area of the second face of the disc to the fluid filtration gap.

40. The device of claim 39 wherein the second feed means comprises one or more holes through the disc, wherein each such hole is located at least 0.25 R from the longitudinal axis of the shaft, where R is the equivalent circular radius of the disc.

41. The device of claim 39 wherein the second feed means comprises one or more holes through the disc, wherein each such hole is located at least 0.50 R from the longitudinal axis of the shaft, where R is the equivalent circular radius of the disc.

42. The method of claim 39 wherein the spiral groove subtends an angle Y in polar coordinates of at least forty-five degrees on the second major face of the disc.

43. The method of claim 39 wherein the spiral groove subtends an angle Y in polar coordinates of at least ninety degrees on the second major face of the disc.

44. A method for reducing the tendency for a rotary disc and a filter defining a fluid filtration gap in a rotary disc filtration device to be forced together by the pumping action caused by the rotation of the disc during the filtration process, the rotary disc filtration device comprising: (a) one or more filter support members each having first and second oppositely disposed major faces, each major face having a filter with (i) an active filtration area, (ii) a peripheral region, and (iii) a longitudinal axis substantially perpendicular to the active filtration area; (b) one or more discs mounted on a rotatable shaft and in alternating interleaved relationship with the filter support members to define a plurality of fluid filtration gaps, each disc having first and second oppositely disposed major faces, each major face having an active area and a peripheral region, the shaft having a longitudinal axis of rotation; each fluid filtration gap being defined by the active area of one of the discs and the active filtration area of the adjacent filter, the active area of the second major face of each of the one or more discs having at least one spiral groove in fluid communication with the fluid when fluid is in the fluid filtration gap defined by the second major face, the spiral groove subtending an angle Y in polar coordinates of at least ten degrees on the second major face of the disc; (c) rotation means for rotating the shaft so that the one or more discs rotate with respect to the filters and a pumping action is created that tends to move fluid in the fluid filtration gaps in a direction away from the longitudinal axis of the shaft; and (d) first feed means for feeding feed fluid to each of the fluid filtration gaps near the longitudinal axis of the shaft; the method comprising providing second feed means in at least one of the one or more discs having a spiral groove for feeding fluid adjacent the active area of the first major face of the disc through the active area of the second major face of the disc to the fluid filtration gap defined by that second major face.

45. The device of claim 44 wherein the second feed means comprises one or more holes through at least the one disc of the one or more discs, wherein each such hole is located at least 0.1 R from the longitudinal axis of the at least one disc, where R is the equivalent circular radius of the disc.

46. The device of claim 44 wherein the second feed means comprises one or more holes through at least the one disc of the one or more discs, wherein each such hole is located at least 0.25 R from the longitudinal axis of the at least one disc, where R is the equivalent circular radius of the disc.

* * * * *

UNITED STATES PATENT AND TRADEMARK OFFICE
CERTIFICATE OF CORRECTION

PATENT NO. : 5,993,674
DATED : November 30, 1999
INVENTOR(S) : Philip M. Rolchigo et al.

It is certified that error appears in the above-identified patent and that said Letters Patent is hereby corrected as shown below:

In claim 34, column 32, line 59, there should be a comma after "filter" and before "fluid".

In claim 34, column 33, line 16, "defied" should be "defined".

Signed and Sealed this

Eighteenth Day of July, 2000

*Attest:*

Q. TODD DICKINSON

*Attesting Officer*     *Director of Patents and Trademarks*